(12) United States Patent
Koishi et al.

(10) Patent No.: US 7,942,322 B2
(45) Date of Patent: May 17, 2011

(54) WORK INSTRUCTION MANAGEMENT SYSTEM, WORK INSTRUCTION MANAGEMENT METHOD, WORK INSTRUCTION MANAGEMENT APPARATUS AND ELECTRONIC PAPER

(75) Inventors: Takeo Koishi, Kawasaki (JP); Hideya Isaka, Yokohama (JP); Yoshiyuki Ogawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 419 days.

(21) Appl. No.: 11/945,027

(22) Filed: Nov. 26, 2007

(65) Prior Publication Data
US 2008/0126424 A1   May 29, 2008

(30) Foreign Application Priority Data
Nov. 27, 2006   (JP) ................................. 2006-319135

(51) Int. Cl.
*G06F 19/00* (2011.01)
(52) U.S. Cl. ...................................................... 235/385
(58) Field of Classification Search .................. 235/385
See application file for complete search history.

(56) References Cited

U.S. PATENT DOCUMENTS

| 5,499,188 A * | 3/1996 | Kline et al. ................... 700/106 |
| 7,427,014 B2 * | 9/2008 | Kimura et al. ................. 235/375 |
| 2002/0143423 A1 * | 10/2002 | Huber et al. ................... 700/121 |
| 2005/0113949 A1 * | 5/2005 | Honda ............................. 700/95 |
| 2006/0164244 A1 * | 7/2006 | Kiriyama .................... 340/572.1 |
| 2007/0250778 A1 * | 10/2007 | Saito et al. ..................... 715/733 |
| 2008/0103715 A1 * | 5/2008 | Tsuda et al. ..................... 702/81 |

FOREIGN PATENT DOCUMENTS

| JP | 2005-335004 | 12/2005 |
| JP | 2005-335004 A | 12/2005 |

* cited by examiner

*Primary Examiner* — Daniel A Hess
*Assistant Examiner* — David Tardif
(74) *Attorney, Agent, or Firm* — Brundidge & Stanger, P.C.

(57) ABSTRACT

A work instruction management device includes a unit that obtains information stored in a radio frequency IC tag and information on a radio frequency IC tag reader, and stores the information in a memory. A tracking support unit obtains product information by matching the stored information with a first table, specifies a manufacturing process by matching the tag reader information with a second table, and stores the obtained information in the memory. Another unit specifies a work instruction sheet for the product manufacturing process by matching the product and process information with a third table, generates work instruction sheet data by setting product color information included in the product information for a background or font color of the work instruction sheet, and stores the data in the memory. A work instruction support unit performs processing for outputting the work instruction sheet data to an output interface.

5 Claims, 23 Drawing Sheets

TRACKING HISTORY STORAGE UNIT 221

| SERIAL NUMBER (2211) | VEHICLE BODY NUMBER (2212) | PASSED PROCESS (2213) | PASSED DATE AND TIME (2214) |
|---|---|---|---|
| 1 | VEHICLE BODY A | PROCESS 1 | 20060808 10:10:00 |
| 2 | VEHICLE BODY B | PROCESS 2 | 20060808 10:10:10 |
| 3 | VEHICLE BODY C | PROCESS 3 | 20060808 10:10:20 |
| ... | ... | ... | ... |

WORK INSTRUCTION SEQUENCE STORAGE UNIT 303
                                                              3030

| SEQUENCE NUMBER 3031 | VEHICLE BODY NUMBER 3032 | PROCESS 3033 | INSTRUCTION CODE 3034 | SPECIAL INSTRUCTION 3035 | COMPLETION FLAG 3036 |
|---|---|---|---|---|---|
| 1 | VEHICLE BODY A | PROCESS 1 | INSTRUCTION 1 | URGENT | COMPLETED |
| 2 | VEHICLE BODY B | PROCESS 2 | INSTRUCTION 2 | FOR IMPORTANT CLIENT | NOT COMPLETED |
| 3 | VEHICLE BODY C | PROCESS 3 | INSTRUCTION 3 | INVENTORY ADJUSTMENT | NOT COMPLETED |
| ... | ... | ... | ... | ... | ... |

FIG. 7

FIG. 14A  INSTRUCTION FONT HEADER PATTERN STORAGE UNIT 621

| SPECIAL INSTRUCTION | INSTRUCTION SHEET BACKGROUND COLOR | INSTRUCTION SHEET FONT COLOR |
|---|---|---|
| URGENT | RED | BLACK |
| FOR IMPORTANT CLIENT | YELLOW | BLACK |
| INVENTORY ADJUSTMENT | BLACK | WHITE |
| ... | ... | ... |

6211 / 6212 / 6213 / 6210

FIG. 14B  INSTRUCTION FONT MAIN CONTENT PATTERN STORAGE UNIT 622

| VEHICLE COLOR | INSTRUCTION SHEET BACKGROUND COLOR | INSTRUCTION SHEET FONT COLOR |
|---|---|---|
| YELLOW | YELLOW | BLACK |
| GREEN | GREEN | BLACK |
| NAVY | NAVY | WHITE |
| BLACK | BLACK | WHITE |
| ... | ... | ... |

6221 / 6222 / 6223 / 6220

FIG. 14C  INSTRUCTION SHEET FORM STORAGE UNIT 623

| PROCESS | FORM ARRANGEMENT IMAGE |
|---|---|
| PROCESS 1 | UPPER PORTION: HEADER LOWER PORTION: MAIN CONTENT |
| PROCESS 2 | UPPER PORTION: HEADER LOWER PORTION: MAIN CONTENT |
| PROCESS 3 | LEFT PORTION: HEADER RIGHT PORTION: MAIN CONTENT |
| ... | ... |

6231 / 6232 / 6230

ACTUAL DATA CONTENT IS DATA IN OUTPUT FORMAT. CONTENT CAN BE FREELY SET IN ACCORDANCE WITH OUTPUT FORMAT.

EXAMPLE 1)

| HEADER |
|---|
| MAIN CONTENT |

EXAMPLE 2)

| HEADER | MAIN CONTENT |
|---|---|

SPECIFICATION STORAGE UNIT 803

| VEHICLE BODY NUMBER | VEHICLE COLOR | VEHICLE TYPE | ... |
|---|---|---|---|
| VEHICLE BODY A | YELLOW | SPORT | ... |
| VEHICLE BODY B | GREEN | RV | ... |
| VEHICLE BODY C | NAVY | RV | ... |
| ... | ... | ... | ... |

FIG. 21

WORK INSTRUCTION MANAGEMENT SYSTEM, WORK INSTRUCTION MANAGEMENT METHOD, WORK INSTRUCTION MANAGEMENT APPARATUS AND ELECTRONIC PAPER

CROSS-REFERENCE TO RELATED APPLICATIONS

The present application claims a priority from Japanese Patent Application No. 2006-319135 filed on Nov. 27, 2006, the content of which herein incorporated by reference.

BACKGROUND OF THE INVENTION

1. Field of the Invention

The present invention relates to a work instruction management system, a work instruction management method, a work instruction management apparatus and an electronic paper. Specifically, the present invention relates to techniques for generating/managing work instruction sheets and for preventing leakage of information on the work instruction sheets, in manufacturing processes or the like at the time of manufacturing a product.

2. Related Art

Japanese Patent Application Laid-open Publication No. 2005-335004 proposes a work support system that supports, by appropriately supporting a work performed for a work target in order to reduce burdens on operators, the work consisting of a plurality of processes for the work target. The work support system includes: one or more work instruction devices each being attachable to the location where the work target exists; and a server device capable of transmitting and receiving information to and from aforementioned one or more work instruction devices by use of radio communications. In this system, the server device includes: information obtaining means for obtaining instruction information indicating work content to be executed in each of the plurality of processes; and first communications means for transmitting the instruction information obtained by the information obtaining means to aforementioned one or more work instruction devices. Meanwhile, each of aforementioned one or more work instruction devices includes: second communications means for transmitting and receiving information to and from the server device by use of radio communications; display means capable of rewriting information to be displayed; and control means for causing, on the basis of the instruction information received from the server device via the second communications means, the display means to display work content in a predetermined process among the plurality of processes.

In automobile manufacturing processes where a mixed production of multiple types and colors of automobiles are performed, a large amount of work is assigned to each operator. Accordingly, in a work instruction sheet used in the manufacturing processes, all pieces of information are listed in a single sheet, making it difficult for each operator to select necessary information from such large amount of information by pinpointing the information. Furthermore, another problem is that space provided for a single piece of information in this work instruction sheet is so small that it is difficult to display information in an easy-to-understand manner. Due to such problems, there is a case where a work is accidentally skipped in a quality-focused automobile assembly process. Moreover, in the current situation where work instruction sheets are unilaterally distributed from a management system to the hands of operators, the operators cannot perform works at their own pace, so that the works become more complicated.

In addition, in a case of using a conventional work instruction sheet, which is a printed paper medium, there is a problem that a printer and exclusive sheets of paper for work instruction sheets and the like need to be secured, and various running costs for maintaining/administrating the printer and sheets of paper are required. Furthermore, such work instruction sheet is often lost between processes or after completion of work. Accordingly, in view of prevention of information leakage, there remains a problem.

SUMMARY OF THE INVENTION

The present invention is made in view of the aforementioned problems. The present invention provides a technique for generating/managing work instruction sheets that can be easily used and recognized by operators, and a security management technique for work instruction sheets.

A work instruction management system of the present invention is a system for managing work instruction sheets at the time of manufacturing products. The system includes: a first table defining correspondences between stored information in radio frequency IC tags provided to products or accompanying objects moving along with the products and information on the products; a second table defining correspondences between radio frequency IC tag readers provided to manufacturing processes of the products and the manufacturing processes to which the respective radio frequency IC tag readers are provided; a third table defining correspondences between the manufacturing processes for each of the products and work instruction sheets for the respective manufacturing processes. The system further includes: a tag information obtaining unit configured to obtain the stored information in each of the radio frequency IC tags read by each of the radio frequency IC tag readers and information on the radio frequency IC tag reader itself by performing data communications with the radio frequency IC tag reader and to store the information in a memory; a tracking support unit configured to read the stored information and the information on the radio frequency IC tag reader from the memory, then to obtain information on a product by matching the stored information with the first table, then to specify a manufacturing process by matching the information on the radio frequency IC tag reader with the second table, and to store the obtained information on the given product and the information on the specified manufacturing process in the memory; an instruction sheet form generation support unit configured to read the information on the given product and the information on the manufacturing process from the memory, then to specify a work instruction sheet for the given manufacturing process of the given product by matching the information with the third table, to create work instruction sheet data by setting any one of a background color and font color of the specified work instruction sheet to indicate product color information included in the information on the given product, and then to store the work instruction sheet data in a memory; and a work instruction support unit configured to read the work instruction sheet data from the memory and then to output the work instruction sheet data to an output interface. According to the work instruction management system, a technique for generating/managing work instruction sheets that can be easily used and recognized by operators and a security management technique for work instruction sheets can be provided.

Furthermore, according to an aspect of the work instruction management system of the present invention, in the system, the third table defines correspondences between the manufacturing processes for each of the products and work instruction sheets of the respective manufacturing processes, and between display colors of the respective work instruction sheets and special instructions for each of the products or for each of the manufacturing processes at the time of work. Furthermore, in the system, the instruction sheet form generation support unit reads information on a product and information on a manufacturing process from the memory, then specifies a work instruction sheet in a given manufacturing process of a given product and a display color of the work instruction sheet in accordance with a special instruction by matching the information with the third table, then generates work instruction sheet data in which the entire area of the specified work instruction sheet or a specific area for the special instruction thereof have any one of a background color and font color set to show the display color in accordance with the special instruction, and then stores the work instruction sheet data in the memory. According to the aspect of the work instruction management system, the display form of a work instruction can be changed or enhanced in accordance with various special instructions such as attributes of clients, an urgency level of manufacturing and special work content. Thereby, it is possible to attempt to make the special instructions known to all operators.

Moreover, according to an aspect of the work instruction management system of the present invention, the work instruction management system comprising an electronic paper, the electronic paper including a memory; an arithmetic unit; a communication device configured to perform data communications with the work instruction support unit; a display device. The electronic paper is a work instruction sheet medium provided to one of the products or one of the accompanying articles moving along with the products. In the system, the work instruction support unit outputs the work instruction sheet data to the electronic paper, and the electronic paper may include: a data obtaining unit configured to receive the work instruction sheet data by performing data communications with the work instruction sheet support unit and then to store the work instruction sheet data in a memory; and a display processor configured to display the work instruction sheet data stored in the memory on a display device. According to the work instruction management system, the electronic paper instead of a paper medium is employed as a work instruction sheet. Thereby, the running costs and introduction costs for a printer and sheets of paper for the printer, which are required when using a paper medium, are no longer necessary. In addition, since display content of the electronic paper can be changed, work instruction data for each process can be displayed on the electronic paper at the time when a different process is transmitted thereto. Accordingly, a work of generating/printing a work instruction sheet for each process and a work of replacing a work instruction sheet with another for each process are no longer necessary. Thereby, an improvement in work efficiency and a reduction in costs can be attempted.

In addition, according to an aspect of the work instruction management system of the present invention, in the system, the second table defines correspondences between radio frequency IC tag readers arranged in manufacturing processes of the products and at the end boundaries of the manufacturing processes, and the manufacturing processes and an area outside of the manufacturing processes, in which the radio frequency IC tag readers are arranged. In the system, the third table defines a work instruction sheet in an area outside of the manufacturing processes in addition to the correspondences between the manufacturing processes for each of the products and work instruction sheets for the respective manufacturing processes. In the system, the tracking support unit determines, by matching information on the radio frequency IC tag reader with the second table, whether or not the given IC tag is located at the area outside of the manufacturing processes, and then stores the information on the product and determination event data regarding the area outside of the manufacturing processes in the memory. In the system, the instruction sheet form generation support unit reads the information on the product and the determination event data regarding the area outside of the manufacturing processes from the memory, then specifies a work instruction sheet in the area outside of the manufacturing processes of the given product by matching the information and data with the third table, and then stores the specified work instruction sheet data of the area outside of the manufacturing processes in the memory. In the system, the work instruction support unit may read the work instruction sheet data of the area outside of the manufacturing processes from the memory and then output the work instruction sheet data to the electronic paper. Thereby, at the point when a predetermined manufacturing process ends, content of a work instruction sheet can be limited to that concerning a specification outside of an area of the manufacturing process. Accordingly, security for work instruction sheets and manufacturing processes can be maintained at a high level.

Furthermore, according to an aspect of the work instruction sheet management system of the present invention, in the system, the work instruction sheet of the area outside of the manufacturing processes may include data in which description content as to all of or a specific part of display content of the work instruction sheet is cleared. In this way, confidential information, personal information or the like included in a work instruction sheet can be cleared at the point where a product or a half-completed product is located in an area outside of manufacturing processes. Thus, security for work instruction sheets and the manufacturing processes thus can be maintained at a high level.

Moreover, according to an aspect of the work instruction sheet management system of the present invention, in the system, the instruction sheet form generation support unit reads information on a product and information on a manufacturing process from a memory, then specifies work instruction sheets for the given manufacturing process of the given product and for any one of the previous and subsequent manufacturing processes of the given manufacturing process by matching the information with the third table, then generates work instruction sheet data by setting any one of a background color and font color in the work instruction sheets to indicate product color information included in the information on the given product, the work instruction sheets related to the specified manufacturing process and any one of the previous and subsequent manufacturing processes, and stores the generated work instruction sheet data in the memory. In the system, the work instruction support unit reads the work instruction sheet data related to the given manufacturing process and the previous or subsequent manufacturing processes of the given manufacturing process and then outputs the data to the electronic paper. In the electronic paper of the system, the data obtaining unit receives, from the work instruction support unit, the work instruction sheet data related to the manufacturing process and the previous or subsequent manufacturing processes of the manufacturing process and stores the work instruction data for the plurality of processes in the memory, and the display processor may read work instruction sheet data of a process indicated by a transition instruction upon receipt of the transition instruction of display content from an input interface included in the electronic paper, and display the work instruction sheet data on a display device. In this way, upon request from an operator, not only a work instruction sheet for one process, but also a work instruction sheet for any one of the previous and subsequent processes of the aforementioned process can be efficiently shown in the electronic paper.

In addition, according to the electronic paper of the work instruction sheet management system of the present invention, in the electronic paper of the system, in a case where the display processor searches the memory for work instruction sheet data of a process indicated by the transition instruction, and finds that the work instruction sheet data of the given process is not stored in the memory, the display processor notifies the data obtaining unit of a request for obtaining the work instruction sheet data related to the given process. In the electronic paper of the system, the data obtaining unit transmits the request for obtaining the data to the instruction sheet form generation support unit. Upon receipt of the request for obtaining the data, the instruction sheet form generation support unit specifies a work instruction sheet of the given manufacturing process of the given product by matching information on the given manufacturing process of the given product included in the request for obtaining the data with the third table. Then, the instruction sheet form generation support unit may generate work instruction sheet data by setting any one of a background color of or font color of the specified work instruction sheet related to the given manufacturing process to indicate product color information included in the information on the product, and then store the generated work instruction sheet data in a memory. In this way, even upon request from an operator for work instruction sheet data not previously stored in a memory of the electronic paper, the work instruction sheet data can be efficiently obtained and shown in the electronic paper.

Furthermore, an aspect of the present invention provides a work instruction sheet management method in a computer system managing a work instruction sheet at the time of manufacturing, connected in an accessible manner to a first table defining correspondences between stored information in radio frequency IC tags provided to products or accompanying objects moving along with the products, and information on the products; a second table defining correspondences between radio frequency IC tag readers provided to manufacturing processes of the products, and the manufacturing processes to which the respective radio frequency IC tag readers are provided; and a third table defining correspondences between the manufacturing processes for each of the products, and work instruction sheets for the respective manufacturing processes. Here, the method comprising: obtaining the stored information in each of the radio frequency IC tags read by each of the radio frequency IC tag readers and information on the radio frequency IC tag reader itself by performing data communications with the radio frequency IC tag reader, and then storing the information in a memory; reading the stored information and the information on the radio frequency IC tag reader from the memory, then obtaining information on the given product by matching the stored information with the first table, then specifying a manufacturing process by matching the information on the radio frequency IC tag reader with the second table, and storing the obtained information on the product and the information on the specified manufacturing process in the memory; reading the obtained information on the product and the information on the manufacturing process from the memory and matching the information with the third table, then specifying a work instruction sheet for the given manufacturing process of the given product, then generating work instruction sheet data by setting any one of a background color and font color of the specified work instruction sheet to indicate product color information included in the information on the product and then storing the work instruction sheet data in a memory; and reading the work instruction sheet data from the memory and then outputting the work instruction sheet data to an output interface. In this way, a technique for generating/managing work instruction sheets that can be easily used and recognized by operators, and a security management technique for work instruction sheets can be provided.

In addition, an aspect of the present invention provides a work instruction management apparatus for managing a work instruction sheet at the time of manufacturing. The work instruction management apparatus includes: a first table defining correspondences between stored information in radio frequency IC tags provided to products or accompanying objects moving along with the products, and information on the products; a second table defining correspondences between radio frequency IC tag readers provided to manufacturing processes of the products, and the manufacturing processes to which the respective radio frequency IC tag readers provided; a third table defining correspondences between the manufacturing processes for each of the products and work instruction sheets for the respective manufacturing processes; a tag information obtaining unit configured to obtain the stored information in each of the radio frequency IC tags read by each of the radio frequency IC tag readers and information on the radio frequency IC tag reader itself by performing data communications with the radio frequency IC tag reader, and to store the information in a memory; a tracking support unit configured to read the stored information and the information on the radio frequency IC tag reader from the memory, then to obtain information the a given product by matching the stored information with the first table, then to specify a manufacturing process by matching the information on the radio frequency IC tag reader with the second table, and to store the obtained information on the product and the information on the specified manufacturing process in the memory; an instruction sheet form generation support unit configured to read the information on the product and the information on the manufacturing process from the memory, then to specify a work instruction sheet for the given manufacturing process of the given product by matching the information with the third table, then to create work instruction sheet data by setting any one of a background color and font color of the specified work instruction sheet to indicate product color information included in the information on the product, and then to store the work instruction sheet data in a memory; and a work instruction support unit configured to read the work instruction sheet data from the memory and then to perform output processing for outputting the work instruction sheet data to an output interface. Accordingly, the work instruction management apparatus can configure the work instruction management system achieving a technique for generating/ managing work instruction sheets that can be easily used and recognized by operators, and a security management technique for work instruction sheets.

In addition, an aspect of the present invention provides the electronic paper for a work instruction sheet medium provided to a product or an accompanying object moving along with the product in a manufacturing process, comprising: a memory, an arithmetic device, a communication device performing data communications with the work instruction support unit, and a display device; a data obtaining unit configured to receive, by performing data communications, work instruction sheet data from a work instruction management device managing work instruction sheets at the time of manufacturing, and then to store the data in a memory; and a display processor configured to display the work instruction sheet data stored in the memory on a display device. Accordingly, the electronic paper and the work instruction management apparatus can configure the work instruction management system achieving a technique for generating/managing work instruction sheets that can be easily used and recognized by operators, and a security management technique for work instruction sheets.

In addition, the problem disclosed in this application and the solving method thereof will be made clear in the section of detailed description of the preferred embodiment and through the accompanying drawings.

According to the present invention, a technique for generating/managing work instruction sheets that can be easily used and recognized by operators and a security management technique for work instruction sheets are provided.

BRIEF DESCRIPTION OF THE DRAWINGS

FIG. 3 is a diagram showing an example of registration content of a tracking history storage unit;

FIG. 7 is a diagram showing an example of registration content of a work instruction sequence storage unit;

FIG. 14A is a diagram showing an example of registration content of an instruction font header pattern storage unit;

FIG. 14B is a diagram showing an example of registration content of an instruction font main content pattern storage unit;

FIG. 14C is a diagram showing an example of registration content of an instruction sheet form storage unit;

FIG. 21 is a diagram showing an example of registration content of a specification storage unit;

DETAILED DESCRIPTION OF THE INVENTION

System Configuration

Figure 1:
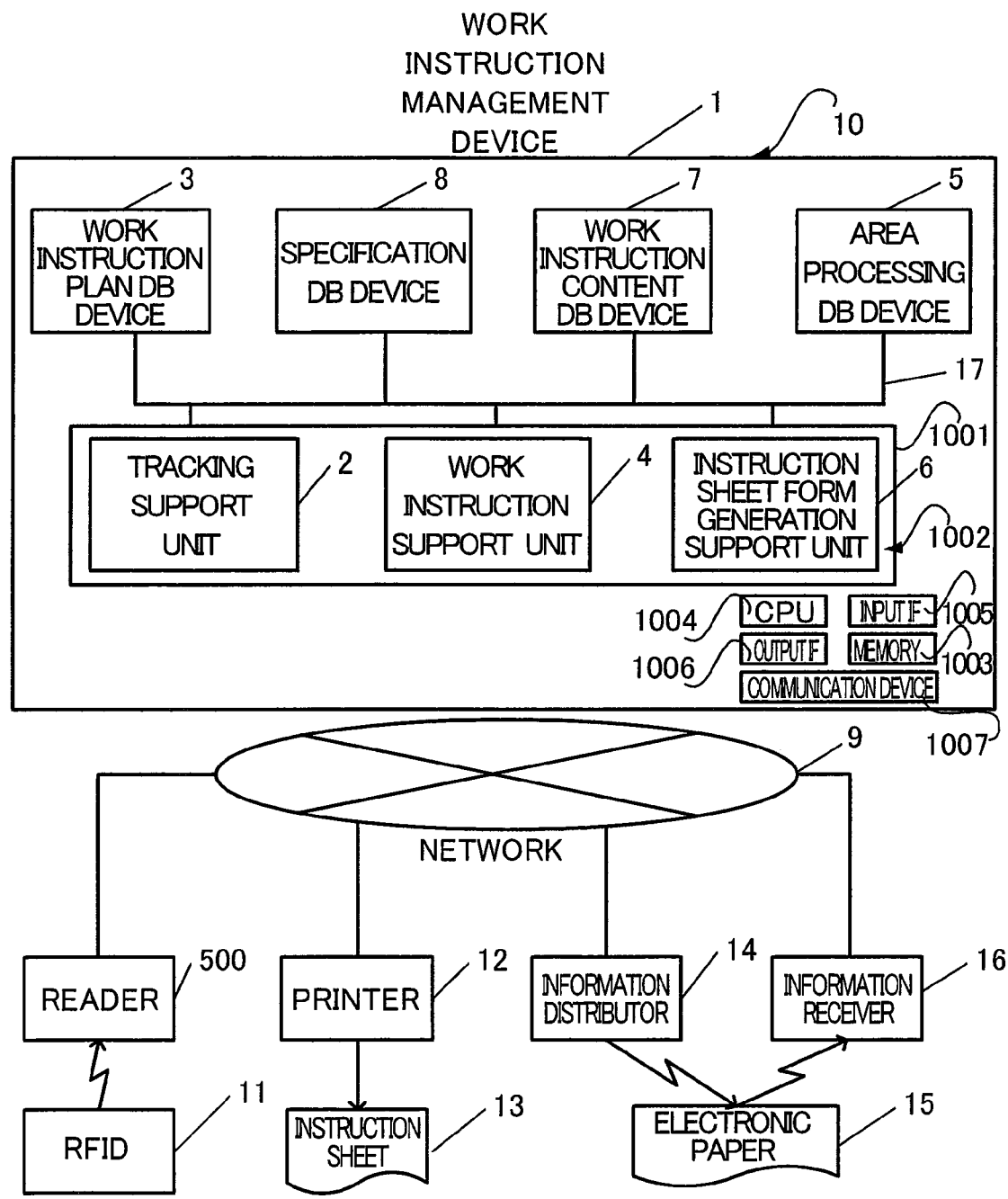
FIG. 1 is a network configuration diagram including a work instruction management system according to the present embodiment.

Hereinafter, detailed descriptions will be given of an embodiment of the present invention by use of the accompanying drawings. FIG. 1 is a network configuration diagram including a work instruction management system of the present embodiment. A work instruction management system 10 (hereinafter, simply referred to as a system 10) of the present embodiment is assumed to be a system in which a work instruction management device 1 and an electronic paper 15 cooperate with each other and generate/manage work instruction sheets in an automobile manufacturing line of a certain automobile maker, for example. As a matter of course, the present invention can be applied to a situation where work instruction sheets are generated/managed in a manufacturing process of any product.

In order to implement a function of executing a work instruction management method of the present invention, the work instruction management device 1 constituting the system 10 reads a program 1002 stored in an program database 1001, such as a rewritable memory, to a memory 1003 and then executes the program by a CPU 1004, which is a processing unit. Furthermore, the work instruction management device 1 includes components generally included in a computer. Specifically, the work instruction management device 1 includes an input interface 1005 such as various keyboards and buttons, an output interface 1006 such as a display, and a communication device 1007 for transmission and reception of data between an electronic paper 15 and a radio frequency IC tag reader 500. The work instruction management device 1 executes the transmission and reception of data by connecting the electronic paper 15, the radio frequency IC tag reader 500 and the like with each other via a network 9 such as the Internet, a LAN, a serial interface communication line or the like, for example.

Next, descriptions will be given of function units configured and retained by the work instruction management device 1 on the basis of the program 1002, for example. It should be noted that the system 10 is configured to be capable of utilizing: a first table defining correspondences between information stored in RFIDs 11 that are radio frequency IC tags respectively provided and attached to products or to accompanying objects moving together with the respective products, and information on the products; a second table defining correspondences between radio frequency IC tag readers 500 provided to manufacturing processes of the products, and the manufacturing processes to which the radio frequency IC tag readers 500 are provided; and a third table defining correspondences between the manufacturing processes for each of the products and work instruction sheets of the respective manufacturing processes. In addition, correspondences between the first to third tables and various databases in the present embodiment will be described later.

Tag Information Obtaining Unit

The work instruction management device 1 included in the work instruction management system 10 is provided with a tag information obtaining unit 201. The tag information obtaining unit 201 performs data communications with the radio frequency IC tag readers 500 provided at key points of the manufacturing processes and areas outside the manufacturing processes, in order to obtain information stored in an RFID 11 (radio frequency IC tag) read by a radio frequency IC tag reader 500 and information on the radio frequency IC tag reader 500 itself, and stores the information in the memory 1003. It should be noted that since this tag information obtaining unit 201 is assumed to be the same as a reader information receiver 201 in an arithmetic unit 200 of a tracking support unit 2 to be described later in this embodiment, this tag information obtaining unit 201 is referred to as a reader information receiver 201, hereinafter.

Tracking Support Unit

Furthermore, the work instruction management device 1 included in the work instruction management system 10 is provided with the tracking support unit 2. The tracking support unit 2 reads the stored information and the information on the radio frequency IC tag reader 500 from the memory 1003, to obtain information on a product (various attribute information such as a product specification) by matching the stored information with information in the first table, and to specify a manufacturing process by matching the information on the wireless tag reader 500 with information in the second table. The tracking support unit 2 then stores, in the memory 1003, both of obtained information on the product and the specified manufacturing process.

Incidentally, consider a case where: the second table is one that defines correspondences between the radio frequency IC tag readers 500 provided in the manufacturing processes of the products and at the boundaries of the ends of the manufacturing processes, and the manufacturing processes in which the radio frequency IC tag readers 500 are provided and the areas outside the manufacturing process; and the third table is one that defines correspondences between work instruction sheets for the areas outside the manufacturing processes in addition to the correspondences between the manufacturing processes for each of the products and the work instruction sheets for the respective manufacturing processes. In this case, the tracking support unit 2 is configured to include the following functions. The tracking support unit 2 in this case matches the information on the radio frequency IC tag readers 500 with information in the second table, and then determines whether or not the corresponding radio frequency IC tag 11 is in an area outside the manufacturing processes. Then, the tracking support unit 2 stores, in the memory 1003, the information on the product and the determination event data concerning the area outside the manufacturing processes.

Here, a specific example of the tracking support unit 2 in the present embodiment will be described in detail below. The tracking support unit 2 reads, with a radio frequency IC tag reader 500, a vehicle body number and process information as the stored information from an RFID 11 (radio frequency IC tag) (in a case where the radio frequency IC tag readers 500 themselves are respectively connected to the processes, each of the names of or IDs of the radio frequency IC tag readers 500 becomes process information, or alternatively, in a case of writing a piece of process information to a memory region of an RFID 11 at the time when the RFID 11 enters the process handled by a radio frequency IC tag reader 500, the tracking support unit 2 can obtain the process information as the information stored in the RFID 11). The RFID 11 (radio frequency IC tag) is attached to the vehicle body of an automobile, which is the product manufactured in the manufacturing processes being the target for the generation/management of work instruction sheets, or to a conveyer tray for manufacturing the product (conveyer tray for moving a half-completed product).

Moreover, the tracking support unit 2 specifies a vehicle body moving through the manufacturing processes, in reference to the vehicle body number read by the radio frequency IC tag reader 500 from the RFID 11 and recognizes, on the basis of the process information, the manufacturing process to which the vehicle body has progressed at this time. The tracking support unit 2 manages information on the date and time of obtaining the above-mentioned information, together with a history of the products passing through the processes. Thus, the tracking support unit 2 manages the passing status of a vehicle body in a manufacturing process. Here, tracking refers to recognition of the current location of a product in a manufacturing process.

Figure 2:
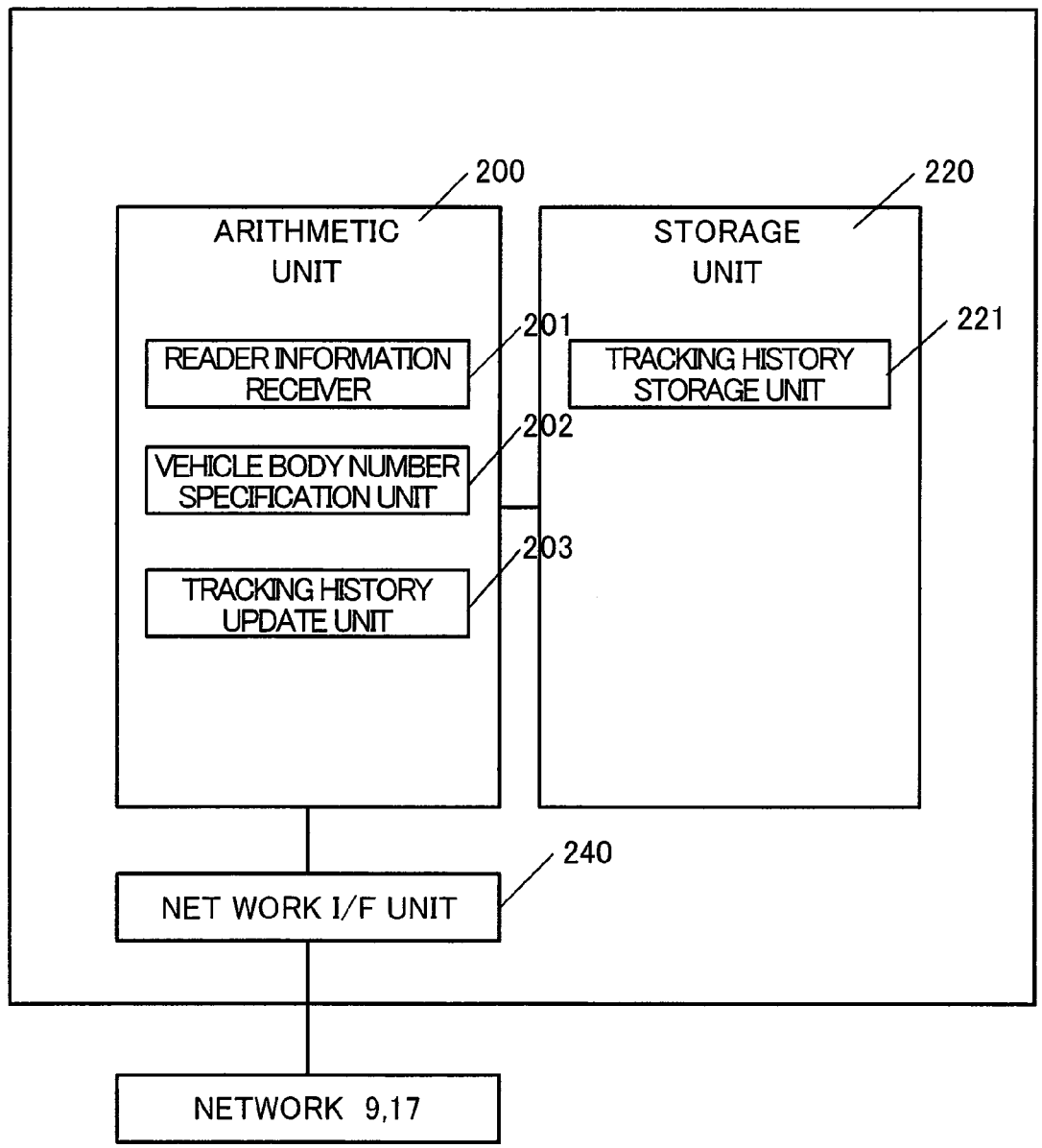
FIG. 2 is a schematic configuration diagram of a tracking support unit.

FIG. 2 is a schematic configuration diagram of the tracking support unit 2. As shown in FIG. 2, the tracking support unit 2 includes the arithmetic unit 200, a storage unit 220 (a portion of the area of the memory 1003) and a network I/F (interface) unit 240 for connecting itself to networks 9 and 17. The storage unit 220 includes a tracking history storage unit 221 to which pass-through history data for tracking received from a radio frequency IC tag reader 500 (referred to as vehicle body number, process information, and date and time information on obtaining the data in the above example) is registered. Although such tracking history data is supposed to be stored in the memory 1003 in the description of claim 1 of the present invention, it can be viewed as that a portion of the area of this memory 1003 is utilized as the tracking history storage unit 221.

FIG. 3 is a diagram showing an example of registration content of the tracking history storage unit 221. As shown in FIG. 3, the tracking history storage unit 221 includes a field 2211 for registering history identification information, a field 2212 for registering a vehicle body number that has passed through a certain process, a field 2213 for registering the process through which the vehicle body has passed, and a field 2214 for registering date and time when the vehicle body passed through the process. Thereby, a record 2210 is formed.

Figure 4:
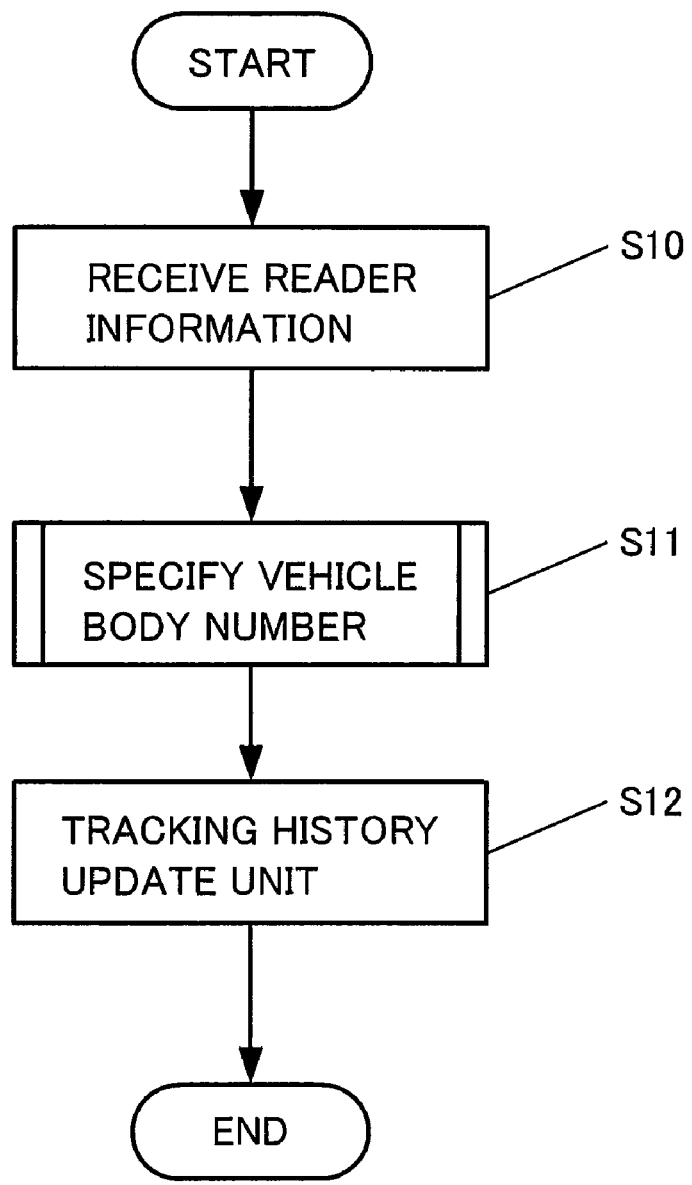
FIG. 4 is a flowchart provided for describing an operation of the tracking support unit.

The arithmetic unit 200 of the tracking support unit 2 in the present embodiment includes a reader information receiver 201, a vehicle body number specification unit 202 and a tracking history update unit 203. FIG. 4 is a flowchart provided for describing an operation of the tracking support unit 2. The reader information receiver 201 (tag information obtaining unit) in the arithmetic unit 200 of the tracking support unit 2 receives, from a radio frequency IC tag reader 500 via the network I/F unit 240, information read from an RFID 11 (vehicle body number and process information) of a vehicle that has passed through a manufacturing process (step S10). Next, upon receipt of the information, the reader information receiver 201 notifies the vehicle body number specification unit 202 of the read information (step 11).

Figure 5:
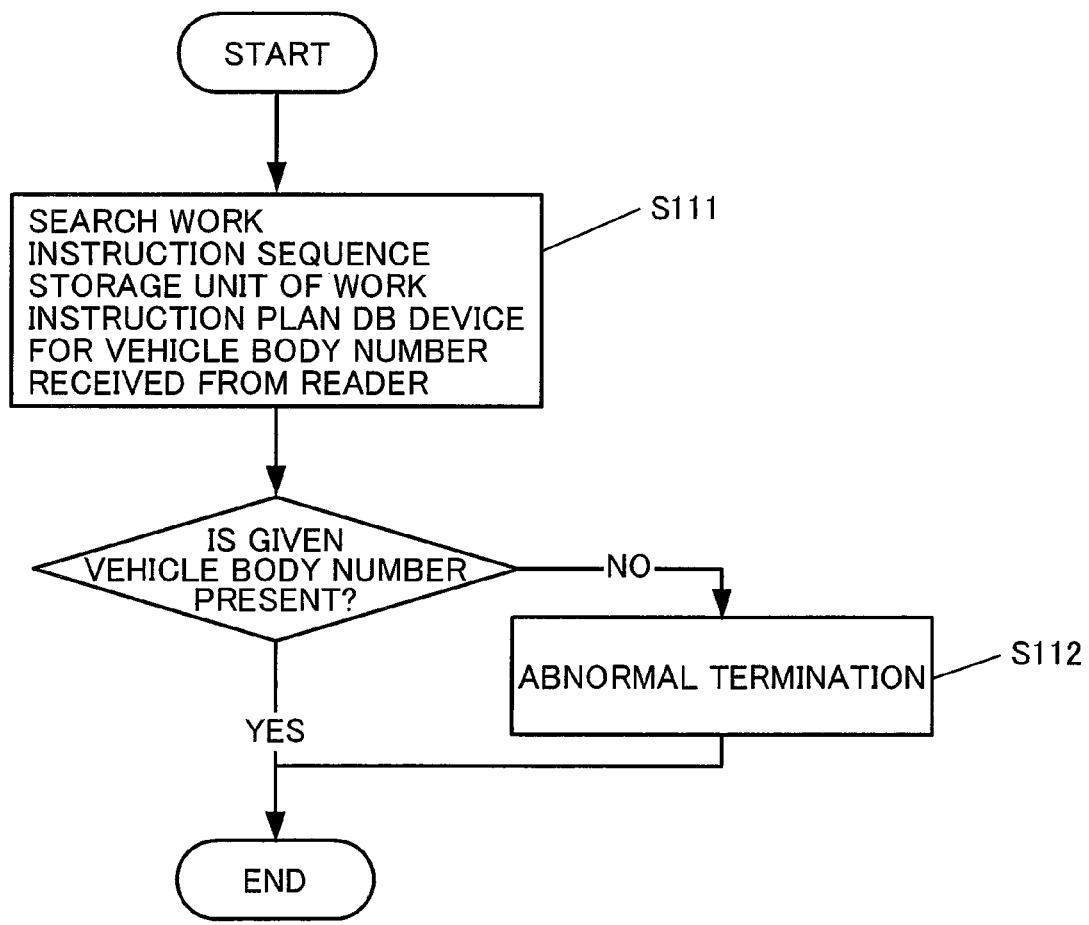
FIG. 5 is a flowchart provided for describing a vehicle body number specification process.

FIG. 5 is a flowchart provided for describing the process in aforementioned step S11 (the vehicle body number specification process) of FIG. 4. Upon receipt of the notification from the reader information receiver 201, the vehicle body number specification unit 202 accesses a work instruction plan DB device 3, and checks whether or not the vehicle body number and process information received in aforementioned step S10 are registered in a work instruction sequence storage unit 303 (step S111). In a case where the vehicle body number and process information received in aforementioned step S10 are registered in the work instruction sequence storage unit 303, the process proceeds to an update process of the tracking history storage unit 221 (step S12). On the other hand, in a case where the vehicle body number and process information received in aforementioned step S10 are not registered in the work instruction sequence storage unit 303, the process ends there as an abnormal termination (step S112). In step S12, the vehicle body number, the process information and the information on passage date and time are added to the tracking history storage unit 221 as a record, and then, the process ends.

Figure 6:
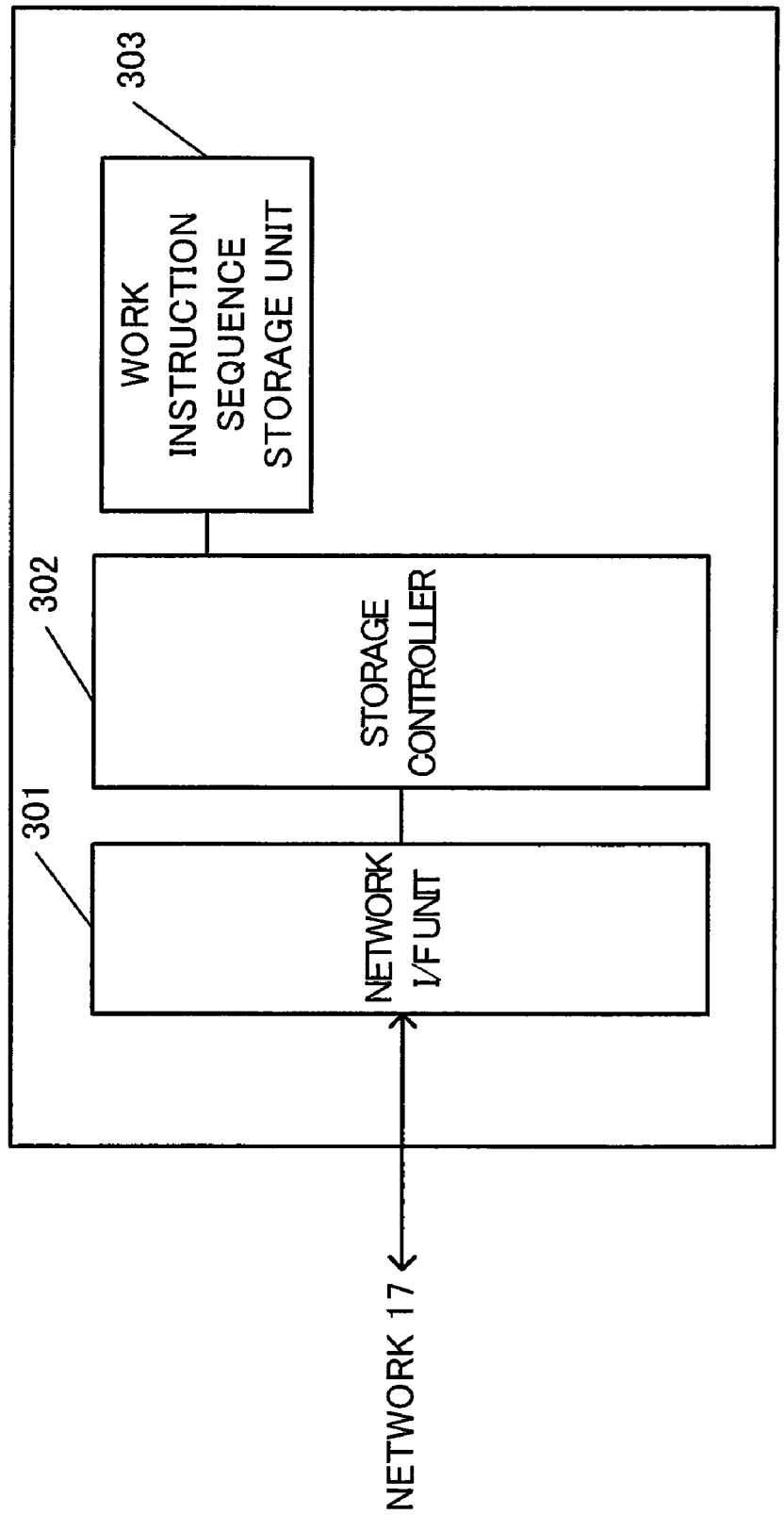
FIG. 6 is a schematic configuration diagram of a work instruction plan database.

It should be noted that the work instruction plan DB device 3 is a database device that manages vehicle body numbers of vehicle bodies manufactured in each process, sequence numbers thereof and work instruction codes or the like while associating them with one another. FIG. 6 is a schematic configuration diagram of the work instruction plan DB device 3. As shown in FIG. 6, the work instruction plan DB device 3 includes a network I/F unit 301 for connecting to the network 17, the work instruction sequence storage unit 303, and a storage controller 302 that controls access to the work instruction sequence storage unit 303.

In the work instruction sequence storage unit 303, the vehicle body numbers of vehicle bodies manufactured in each process, sequence numbers thereof and work instruction codes each indicating a work content are stored. FIG. 7 is a diagram showing an example of registration content of the work instruction sequence storage unit 303. As shown in FIG. 7, the work instruction sequence storage unit 303 includes a field 3031 for registering a sequence number of a work instruction, a field 3032 for registering a vehicle body number specifying the vehicle body of a work instruction target, a field 3033 for registering a process name specifying the process of the work instruction target, a field 3034 for registering an instruction code specifying content of the work instruction, a field 3035 for registering a special instruction specifying an important reminder of the work and a field 3036 for registering information indicating completion of the work. Thereby, a record 3030 is formed.

Work Instruction Support Unit

Furthermore, the work instruction management system 10 of the present embodiment includes a work instruction support unit 4. The work instruction support unit 4 reads the work instruction sheet data from the memory 1003 (a storage unit 620 of an instruction sheet form generation support unit 6), and then outputs the data to an electronic paper 15 via an output interface. As the work instruction sheet data to be outputted to the electronic paper 15 or the like, in addition to normal work instruction sheet data corresponding to a manufacturing process, work instruction sheet data corresponding to an area outside the manufacturing process may be considered. The work instruction sheet data corresponding to an area outside the manufacturing process is assumed to be one where a blank is displayed in the display area for information needing high security such as confidential information, personal information or the like.

Figure 8:
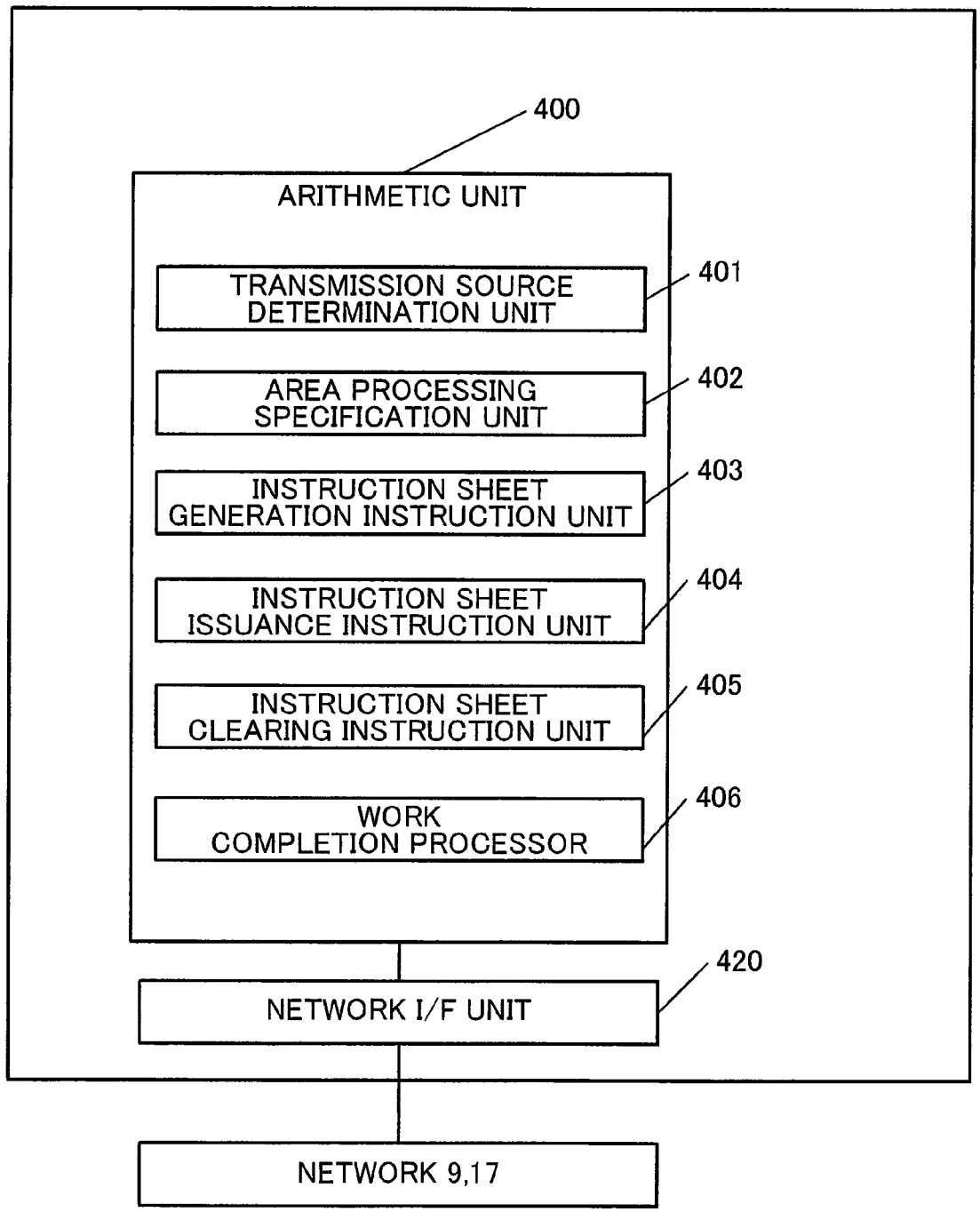
FIG. 8 is a schematic configuration diagram of a work instruction support unit.

The work instruction support unit 4 configured in this manner manages the determination on whether or not work instruction sheet data needs to be generated, and progress in a work instruction in the present embodiment. FIG. 8 is a schematic configuration diagram of the work instruction support unit 4. As shown in FIG. 8, the work instruction support unit 4 of the present embodiment includes an arithmetic unit 400 and a network I/F (interface) unit 420 for connecting to the network 9. The arithmetic unit 400 includes a transmission source determination unit 401, an area processing specification unit 402, an instruction sheet generation instruction unit 403, an instruction sheet issuance instruction unit 404, an instruction sheet clearing instruction unit 405 and a work completion processor 406.

Figure 9:
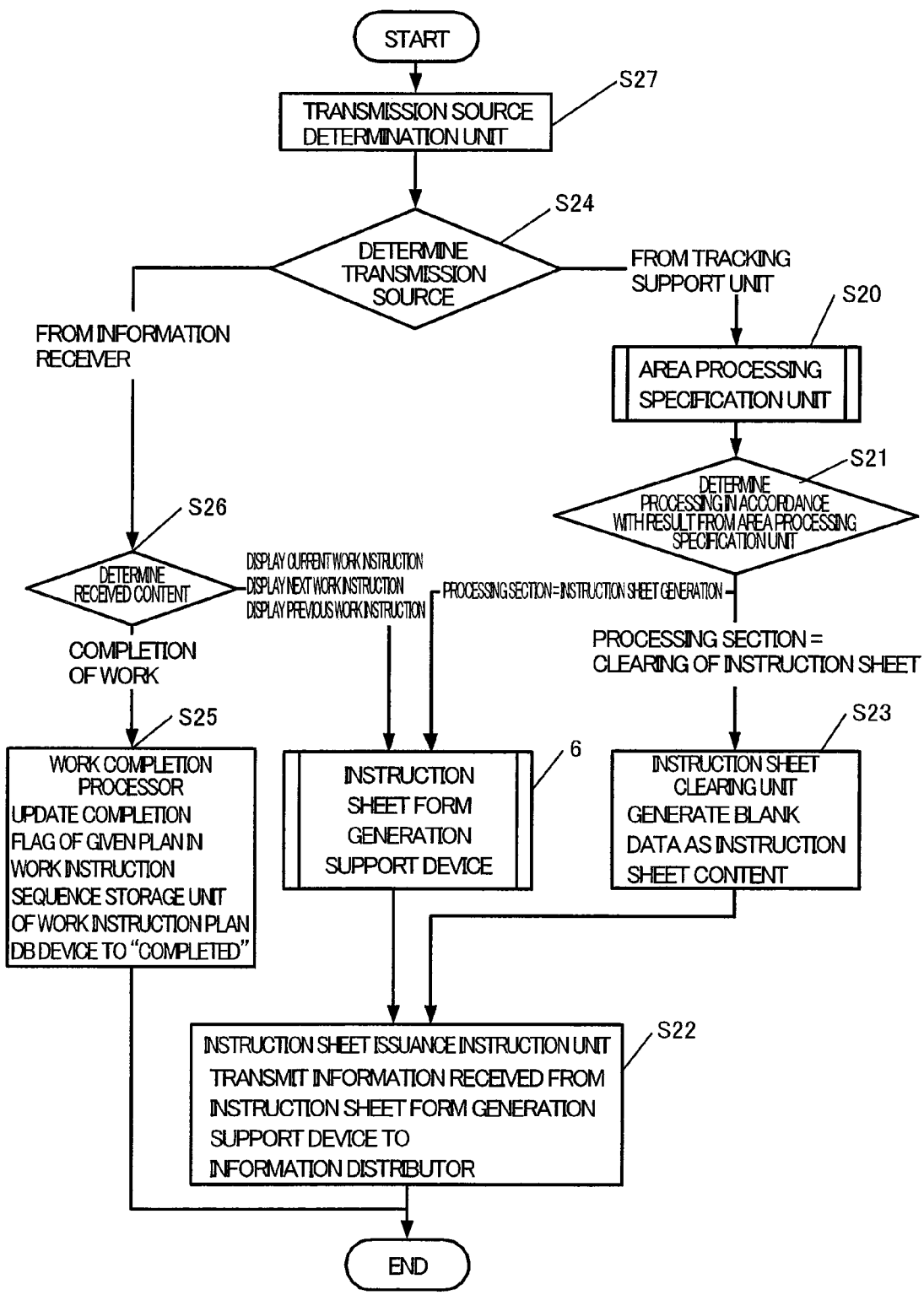
FIG. 9 is a flowchart provided for describing an operation of the work instruction support unit.

Hereinafter, a description will be given in detail of an operation flow of the work instruction support unit 4 of the present embodiment. FIG. 9 is a flowchart provided for describing the operation of the work instruction support unit 4. The transmission source determination unit 401 of the work instruction support unit 4 receives, from the tracking support unit 2 or an information receiver 16 of the electronic paper 15 (which mediates data transmission from a communication device 1503 of the electronic paper 15 to the network 9), vehicle information (for example, a vehicle body number and process information in a case where the information is originated from the tracking support unit 2; and a vehicle body number, process information and operation information in a case where the information is originated from an information receiver 16) via the network I/F unit 420 (step S27).

Upon receipt of the vehicle information, the transmission source determination unit 401 determines the transmission source of the vehicle information. In a case where the transmission source is the tracking support unit 2, the transmission source determination unit 401 notifies the area processing specification unit 402 of the vehicle information (step S20). On the other hand, in a case where the transmission source is the information receiver 16, the process proceeds to step S26.

Figure 10:
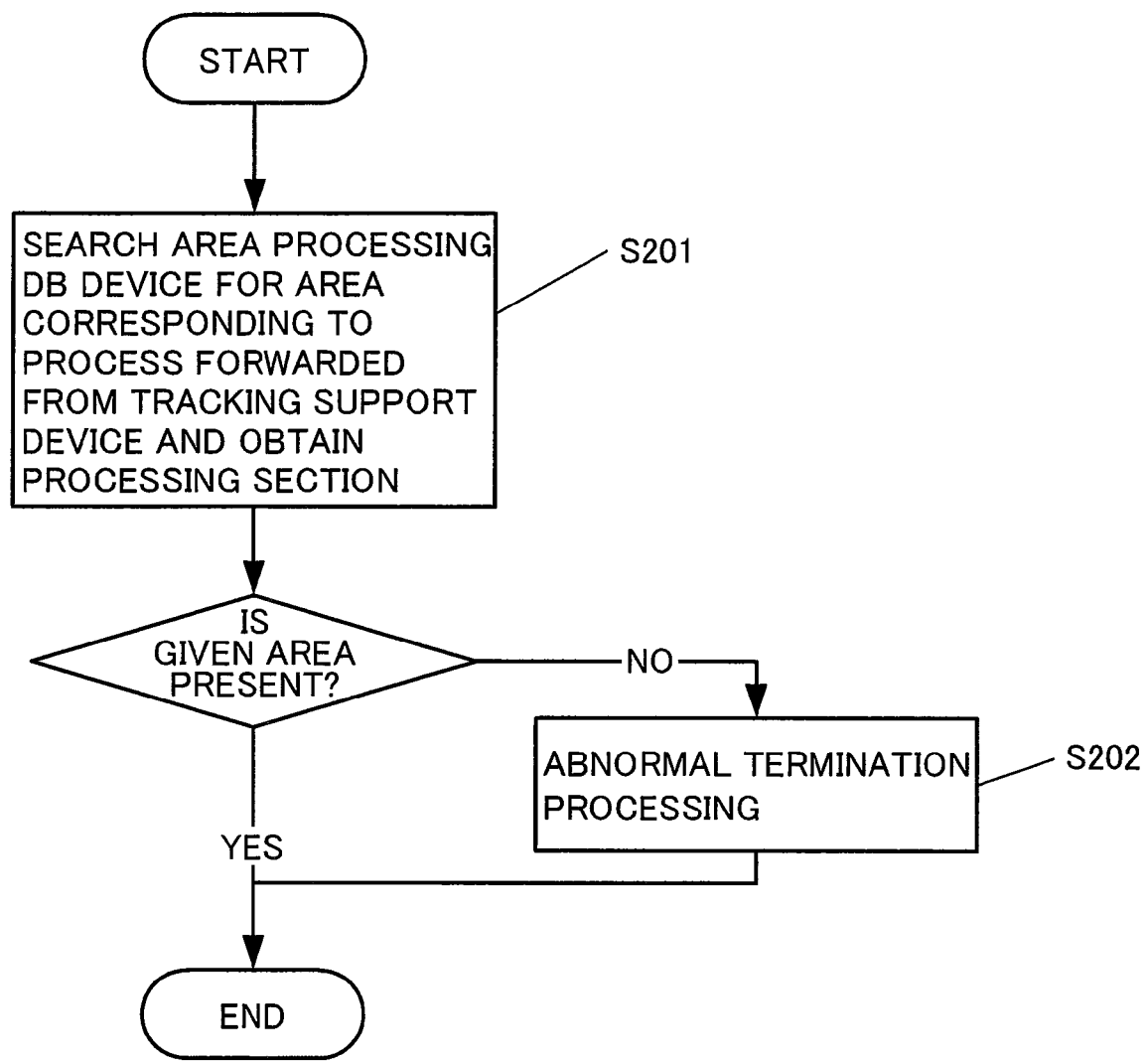
FIG. 10 is a flowchart provided for describing an area processing specification process.

FIG. 10 is a flowchart provided for describing the process (the area processing specification process) in S20 of FIG. 9. Upon receipt of the vehicle information in step S20, the area processing specification unit 402 accesses an area processing DB device 5 and specifies a processing section in reference to an area processing storage unit 503 on the basis of the process information received in step S27 (step S201).

In a case where the area processing specification unit 402 determines in this specification process that the processing section corresponding to the process information (area) is registered in the area processing DB device 5, the process proceeds to step S21. On the other hand, in a case where the processing section corresponding to the process information (area) is not registered in the area processing DB device 5, the process goes through an abnormal termination process (step S202) and then ends the process flow.

Next, the area processing specification unit 402 determines, in accordance with the processing section specified in aforementioned step S201, whether to generate a work instruction sheet or to perform a clearing process of the work instruction sheet (step S21). In a case where the result of this determination is "work instruction sheet generation," the area processing specification unit 402 notifies an instruction sheet form generation support unit 6 of an instruction to generate the work instruction sheet. On the other hand, in a case where the result of the determination is "clearing of an instruction sheet," the area processing specification unit 402 notifies the instruction sheet clearing instruction unit 405 of an instruction to clear the work instruction sheet.

The instruction sheet clearing instruction unit 405 generates blank data as the content of the work instruction sheet and then notifies the instruction sheet issuance instruction unit 404 of the content of the work instruction sheet. In this case, the instruction sheet form generation support unit 6 generates work instruction sheet data and transmits the data to the instruction sheet issuance instruction unit 404. Upon receipt of the data, the instruction sheet issuance instruction unit 404 notifies an information distributor 14 (which mediates distribution of information from the work instruction device 1 to the communication device 1503) of an instruction to output the work instruction sheet data (step S22). At this time, the work instruction sheet data, and the vehicle information received in step S27 are both transmitted to the information distributor 14. Alternatively, at this time, a request for issuing a work instruction sheet may be issued to the printer 12 rather than the information distributor 14 of the electronic paper 15 (for a location where the electronic paper 15 is not introduced, for example).

It should be noted that in step S26, the next process is determined on the basis of the content received from the information receiver 16. In a case where the received content is "completion of the work," the work completion processor 406 is notified of "completion of the work." In a case other than this, the instruction sheet form generation support unit 6 is notified of the received content. Upon receipt of the determination made in aforementioned step S26, the work completion processor 406 accesses the work instruction plan DB device 3 and then updates, on the basis of the vehicle information received in step S27, the field 3036 of the work instruction sequence storage unit 303 to completion of the work.

Figure 11:
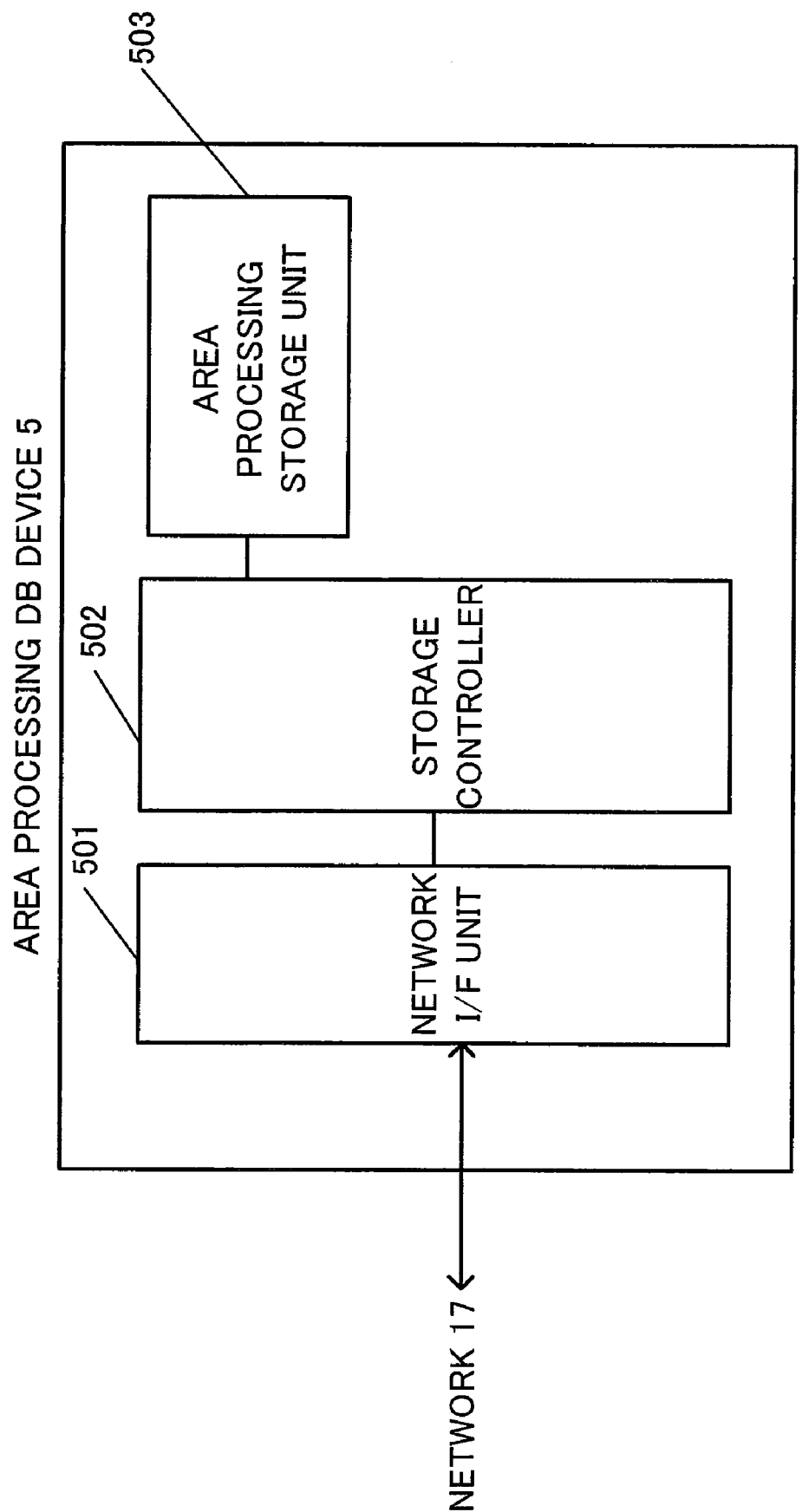
FIG. 11 is a schematic configuration diagram of an area processing database.

It should be noted that the area processing DB device 5 is a device that controls whether or not to generate a work instruction sheet in each process. FIG. 11 is a schematic configuration diagram of the area processing DB device 5. As shown in FIG. 11, the area processing DB device 5 of the present embodiment includes a network I/F unit 501 for connecting to the network 17, an area processing storage unit 503 and a storage controller 502 that controls access to the area processing storage unit 503.

Figure 12:
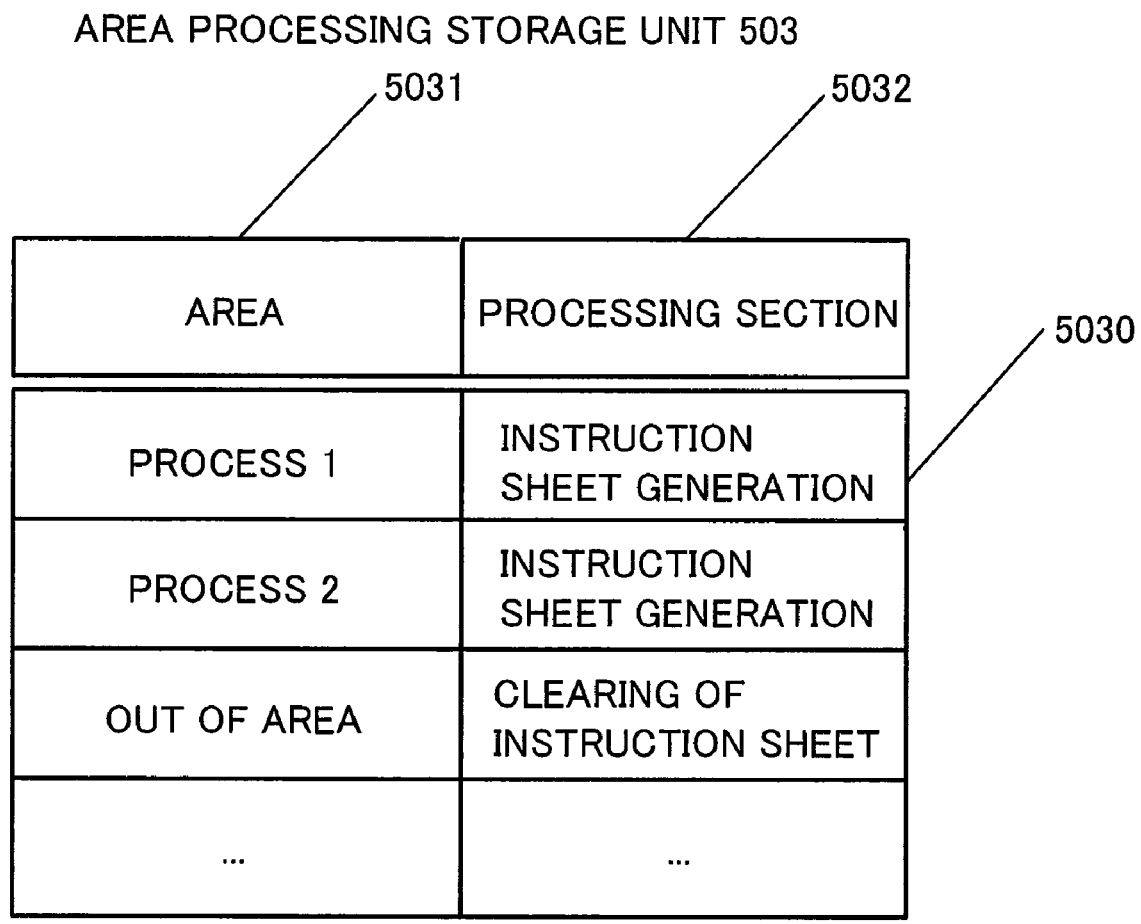
FIG. 12 is a diagram showing an example of registration content of an area processing storage unit.

In the area processing storage unit 503, processing sections for respective areas (work processes) are stored. FIG. 12 is a diagram showing an example of registration content of the area processing storage unit 503. As shown in FIG. 12, the area processing storage unit 503 includes a field 5031 for registering an area and a field 5032 for registering a processing section, and thereby, a record 5030 is formed. In the field 5031 for registering an area, for example, the name of a manufacturing process to which a radio frequency IC tag reader 500 is provided is registered. In addition, in a case where "out of area" is to be registered in a field 5031, "clearing of an instruction sheet" or the like may be registered in the field 5032. In other words, work instruction sheet data for the outside of an area of a manufacturing process is set to be blank.

Instruction Sheet Form Generation Support Unit

Furthermore, the work instruction management system 10 includes an instruction sheet form generation support unit 6. The instruction sheet form generation support unit 6 reads information on a product and information on a manufacturing process from the memory 1003 (the tracking history storage unit 221 of the tracking support unit 2) and matches the information with the aforementioned third table. Then, the instruction sheet form generation support unit 6 specifies a work instruction sheet in the given manufacturing process of the given product, then generates work instruction sheet data by setting color information of the product included in the information on the product, to the background color or font color in the specified work instruction sheet, and stores the work instruction sheet data in the memory 1003 (the storage unit 620 of the work instruction sheet form generation support unit 6).

In addition, in a case where the third table is one that defines correspondences between the manufacturing processes for each of the products and work instruction sheets of the respective manufacturing processes, and display colors of the respective work instruction sheets and special instructions for each of the products or manufacturing processes at the time of work, the instruction sheet form generation support unit 6 serves the following functions. In this case, the instruction sheet form generation support unit 6 reads information on a product and information on a manufacturing process from the memory 1003 (the tracking history storage unit 221 of the tracking support unit 2), and then matches the information with the third table. The instruction sheet form generation support unit 6 then specifies a work instruction sheet in the given manufacturing process of the given product and a display color of the work instruction sheet in accordance with the special instruction, then generates work instruction sheet data by setting the display color corresponding to the special instruction to the background color or font color of the whole work instruction sheet specified here or a specific area for special instruction of the work instruction sheet, and then stores the work instruction sheet data in the memory 1003 (the storage unit 620 of the instruction sheet form generation support unit 6).

Moreover, the instruction sheet form generation support unit 6 reads information on a product and determination event data concerning the outside of an area of a manufacturing process from the memory 1003 (the tracking history storage unit 221 of the tracking support unit 2) and matches the information and data with the third table, then specifies a work instruction sheet in the area outside of the manufacturing process of the given product and stores work instruction sheet data in the area outside of the manufacturing process specified here, in the memory 1003 (the storage unit 620 of the instruction sheet form generation support unit 6). It should be noted that the work instruction sheet of the area outside of the manufacturing process is preferably data in which the whole display content or a specific location of the display content in the work instruction sheet is cleared.

In addition, the instruction sheet form generation support unit 6 is preferably configured in the following manner. The instruction sheet form generation support unit 6 reads information on a product and information on a manufacturing process from the memory 1003 (the tracking history storage unit 221 of the tracking support unit 2) and matches the information with the third table. The instruction sheet form generation support unit 6 then specifies the work instruction sheet of the given manufacturing process of the given product and the work instruction sheet of anyone of the manufacturing processes before and after the specified manufacturing process. Subsequently, the instruction sheet form generation support unit 6 generates work instruction sheet data by setting color information of the product included in the information of the product to the background color or font color in the work instruction sheets related to the specified manufacturing process and any one of the manufacturing processes before and after the specified manufacturing process. The instruction sheet form generation support unit 6 then stores the generated work instruction sheet data in the memory 1003 (the storage unit 620 of the instruction sheet form generation support unit 6).

Figure 13:
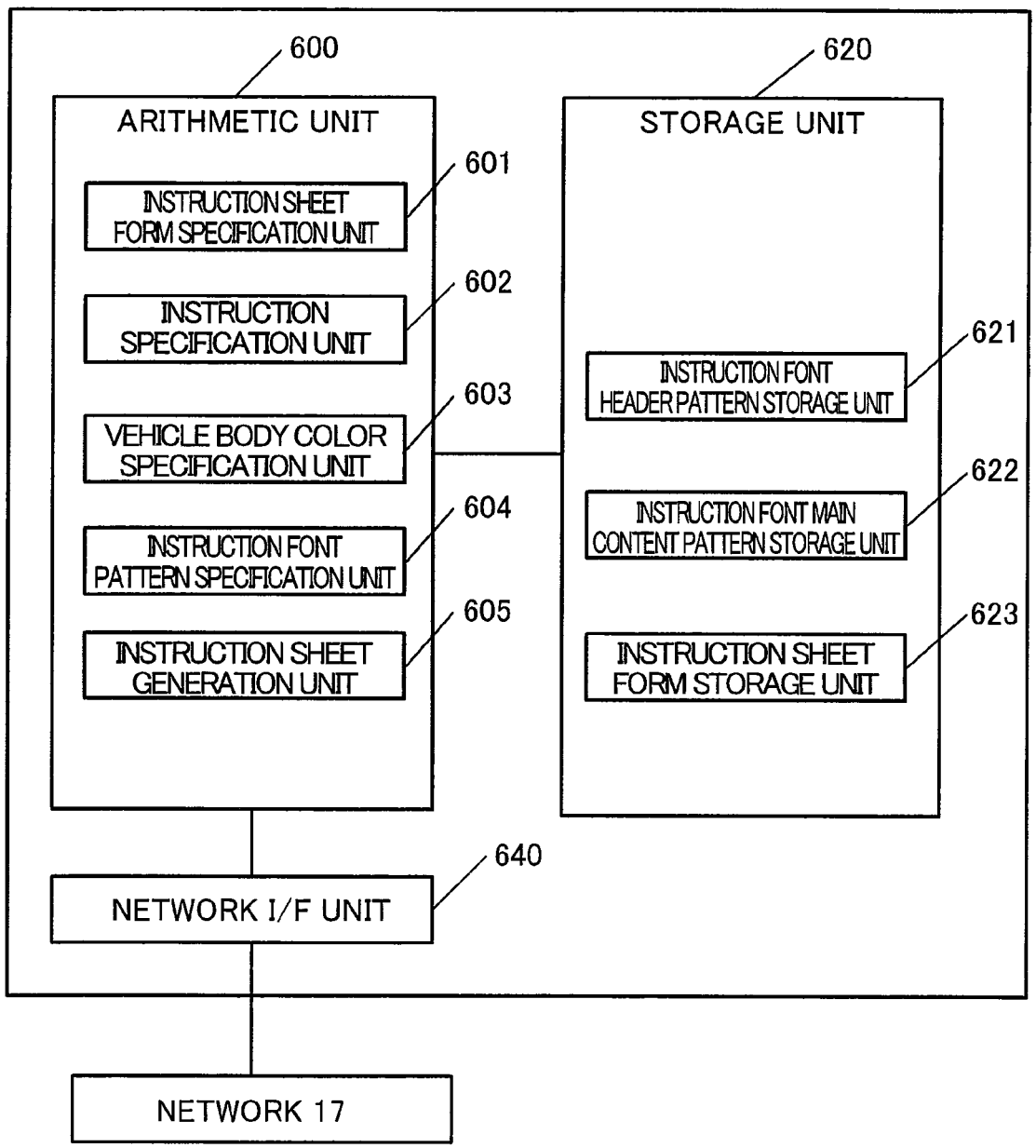
FIG. 13 is a schematic configuration diagram of an instruction sheet form generation support unit.

Here, a specific example of the instruction sheet form generation support unit 6 of the present embodiment will be described in detail below. The instruction sheet form generation support unit 6 of the present embodiment specifies work instruction content in accordance with a vehicle body, a manufacturing process and the like, then generates and manages work instruction sheet data. FIG. 13 is a schematic configuration diagram of the instruction sheet form generation support unit 6. As shown in FIG. 13, the instruction sheet form generation support unit 6 of the present embodiment includes an arithmetic unit 600, a storage unit 620 and a network I/F (interface) unit 640 for connecting to the network 17.

The storage unit 620 includes an instruction font header pattern storage unit 621, an instruction font main content pattern storage unit 622 and an instruction sheet form storage unit 623. This storage unit 620 utilizes a part of the area of the memory 1003 in the work instruction management system 10. It should be noted that since data stored in this storage unit 620 is pattern data that can be re-used as a template, the memory 1003 needs to be a non-volatile memory for its purpose of usage. In a case where the memory 1003 is not a non-volatile memory, a storage area of another storage device (a non-volatile memory such as a hard disk drive) needs to be saved as the storage unit 620.

Hereinafter, a description will be given of each of the storage units 621 to 623 in the storage unit 620. First, in the instruction font header pattern storage unit 621, a color balance pattern of the header portion, which is the top portion of the work instruction sheet, is registered for each special instruction. FIG. 14A is a diagram showing an example of registration content of the instruction font header pattern storage unit 621. As shown in FIG. 14A, the instruction font header pattern storage unit 621 includes a field 6211 for registering a special instruction, a field 6212 for registering a background color of the header and a field 6213 for registering a font color of the header, and thereby, a record 6210 is formed.

Moreover, in the instruction font main content pattern storage unit 622, a color balance pattern of the main content portion of a work instruction sheet is registered for each vehicle color. FIG. 14B is a diagram showing an example of registration content of the instruction font main content pattern storage unit 622. As shown in FIG. 14B, the instruction font main content pattern storage unit 622 includes a field 6221 for registering a vehicle color, a field 6222 for registering a background color of the main content and a field 6223 for registering a font color of the main content, and thereby, a record 6220 is formed.

In addition, in the instruction sheet form storage unit 623, format data of a work instruction sheet is registered for each process. The instruction sheet form storage unit 623 corresponds to the third table of the present invention. FIG. 14C is a diagram showing an example of registration content of the instruction sheet form storage unit 623. As shown in FIG. 14C, the instruction sheet form storage unit 623 includes a field 6231 for registering a process and a field 6232 for registering format data and thereby, a record 6230 is formed.

The arithmetic unit 600 of the instruction sheet form generation support unit 6 of the present embodiment includes an instruction sheet form specification unit 601, an instruction specification unit 602, a vehicle body color specification unit 603, an instruction font pattern specification unit 604 and an instruction sheet generation unit 605.

Figure 15:
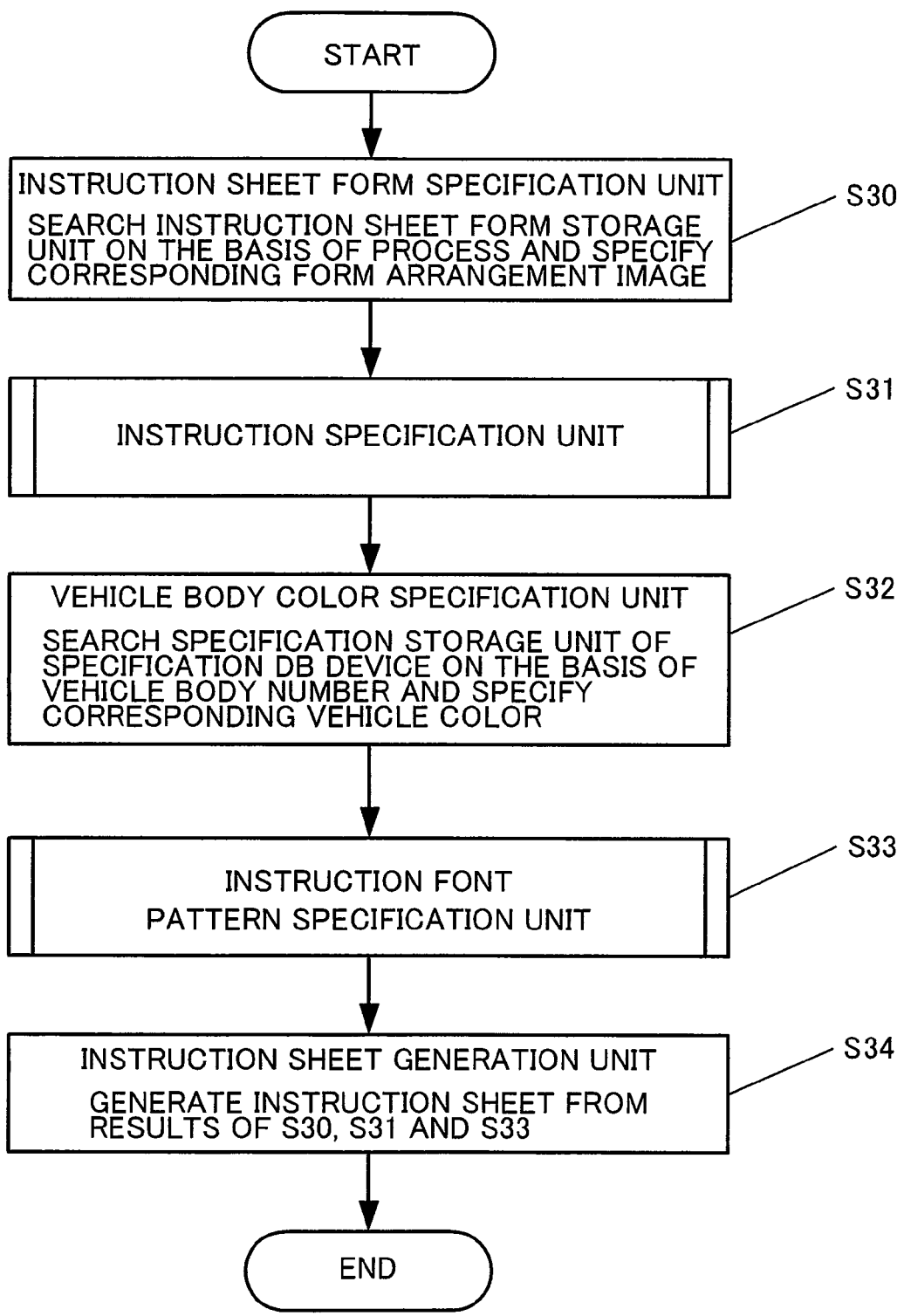
FIG. 15 is a flowchart provided for describing an operation of the instruction sheet form generation support unit.

FIG. 15 is a flowchart provided for describing an operation of the instruction sheet form generation support unit 6. Hereinafter, an exemplar operation flow of the instruction sheet form generation support unit 6 of the present embodiment will be described. First, the instruction sheet form specification unit 601 receives vehicle information (vehicle body number, process and operation information) from the work instruction support unit 4 via the network I/F 640 (step S30). Upon receipt of the information, the instruction sheet form specification unit 601 specifies a form pattern image in reference to the instruction sheet form storage unit 623 on the basis of the process in step S30, and then, the process proceeds to step S31.

Figure 16:
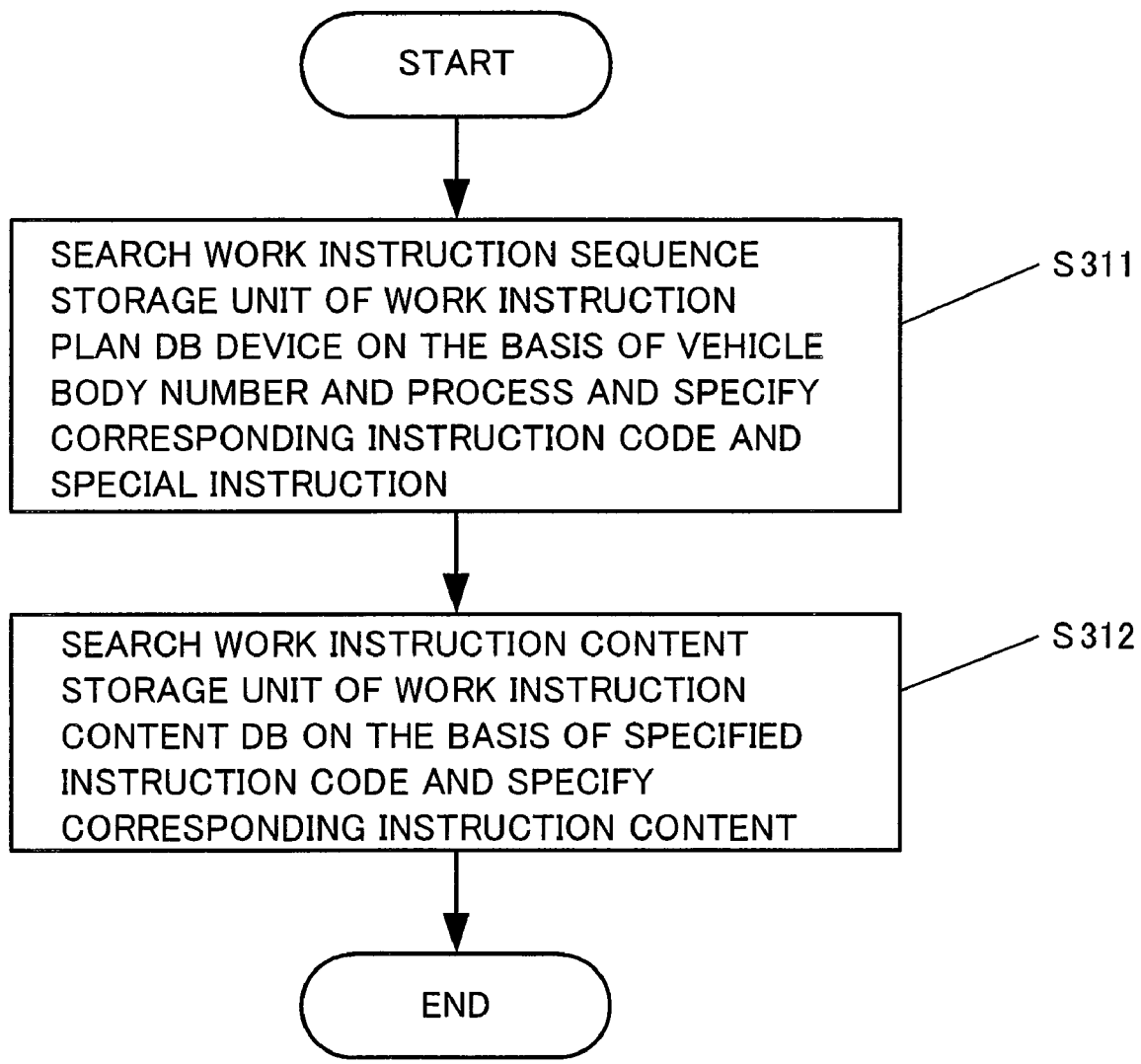
FIG. 16 is a flowchart provided for describing an instruction specification process.

Next, the instruction specification unit 602 specifies instruction content and a special instruction that are to be described in the work instruction sheet. FIG. 16 is a flowchart provided for describing the process (instruction specification process) in step S31 of FIG. 15. The instruction specification unit 602, here, accesses the work instruction plan DB device 3 and specifies a work code in reference to the work instruction sequence storage unit 303 and a special instruction, on the basis of the vehicle body number, process and operation information (an instruction in the electronic paper 15 for an operator), that have been received in step S30, and the process proceeds to step S312 (step S311).

At this time, in a case where the operation information indicates displaying of the next work instruction, the instruction specification unit 602 specifies a special instruction and an instruction code specified with the vehicle body number and the next process. In addition, in a case where the operation information indicates displaying of the previous work instruction, the instruction specification unit 602 specifies a special instruction and, an instruction code specified with the vehicle body number and the previous process. In a case where the processes before and after the process do not exist, the process ends. Moreover, in a case where the operation information indicates displaying of a current work instruction or a NULL, the instruction specification unit 602 specifies a special instruction and an instruction code specified with the vehicle body number and the process. Upon receipt of the information, the instruction specification unit 602 accesses the work instruction content DB device 7, then specifies, on the basis of the instruction code specified in step S311, instruction content to be displayed in the instruction sheet in reference to the work instruction content storage unit 703, and the process proceeds to step S32 (step S312).

Next, the vehicle body color specification unit 603 specifies a vehicle color for specifying a color pattern of the main content portion of a work instruction sheet. The vehicle body color specification unit 603 accesses a specification DB device 8 and specifies the vehicle color in reference to a specification storage unit 803 on the basis of the vehicle body number received in step S30 and the process proceeds to step S33 (step S32)

Figure 17:
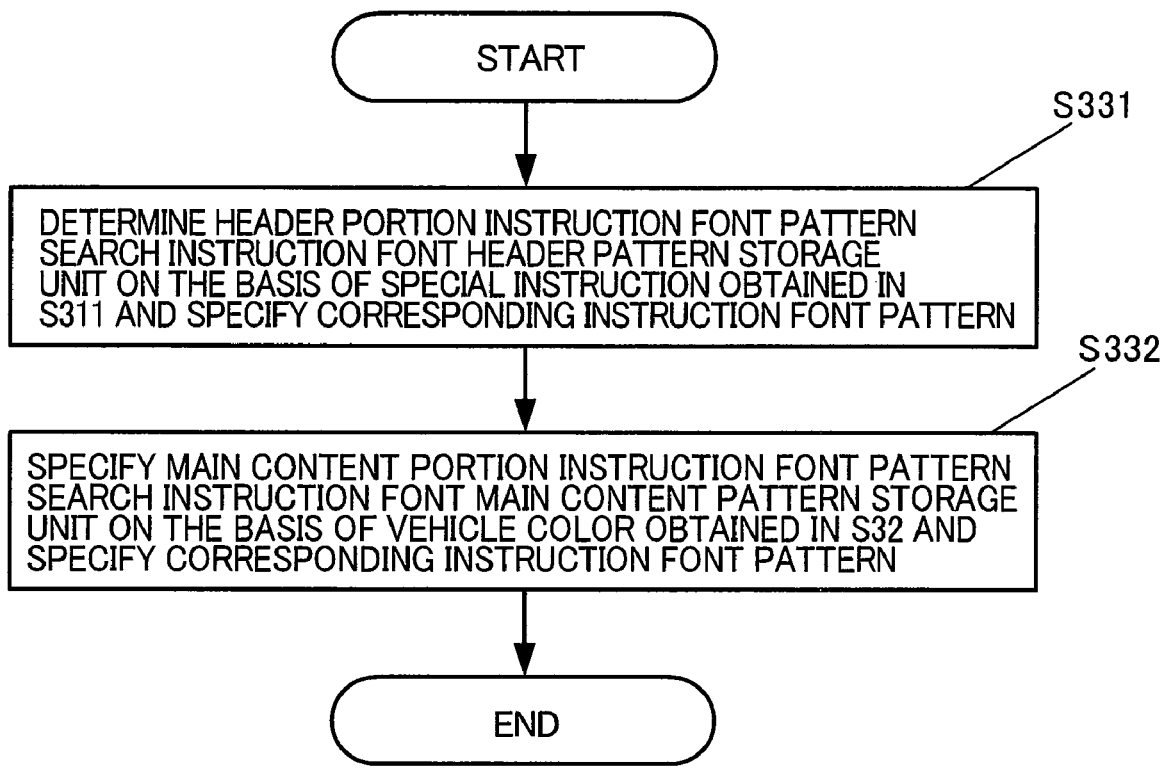
FIG. 17 is a flowchart provided for describing an instruction font pattern specification process.

Next, the instruction font pattern specification unit 604 specifies a color pattern of the work instruction sheet. FIG. 17 is a flowchart provided for describing the process (instruction font pattern specification process) of step S33 of FIG. 15. As shown in FIG. 17, the instruction font pattern specification unit 604 specifies a background color and font color of the header portion of the work instruction sheet in reference to the instruction font header pattern storage unit 621 on the basis of the special instruction specified in step S311, and the process proceeds to step S332 (step S331). Upon completion of this process, the instruction font pattern specification unit 604 specifies a background color and font color of the main content portion of the instruction sheet in reference to the instruction font main content pattern storage unit 622 on the basis of the vehicle color specified in step S32 and the process proceeds to step S34 (step S332).

Next, the instruction sheet generation unit 605 generates work instruction sheet data. The instruction sheet generation unit 605 generates work instruction data by combining: the form pattern image specified in aforementioned step S30; the instruction content specified in step S31; and the background colors and font colors of the header portion of and the main content portion of the instruction sheet specified in step S33. The instruction sheet generation unit 605 then stores the generated work instruction data in the memory 1003 (storage unit 620) and also transmits the data to the work instruction support unit 4 (step S34).

Figure 18:
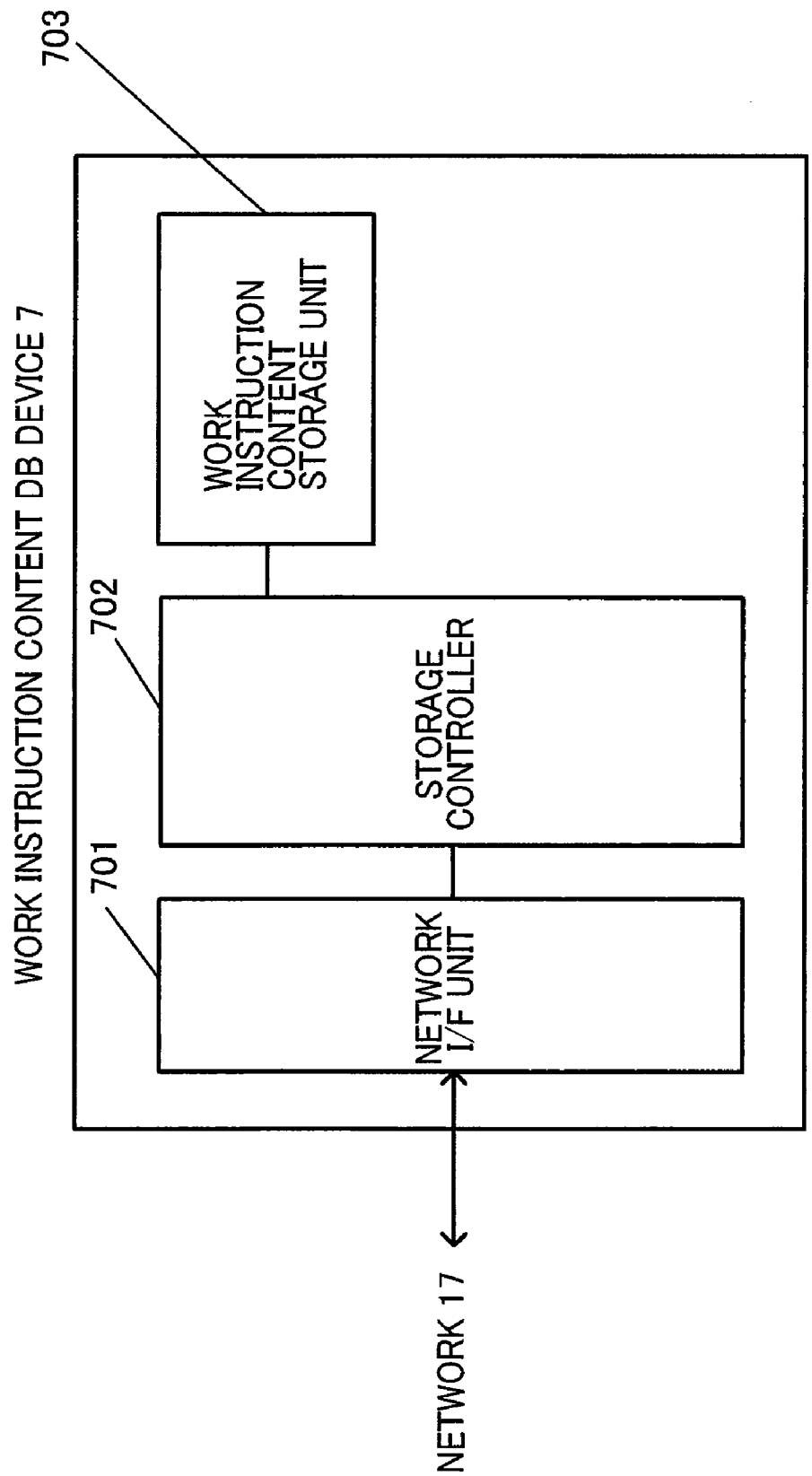
FIG. 18 is a schematic configuration diagram of a work instruction content database.

It should be noted that the work instruction content DB device 7 of the present embodiment is a device that manages instruction content for each instruction code. FIG. 18 is a schematic configuration diagram of the work instruction content DB device 7. As shown in FIG. 18, the work instruction content DB device 7 includes a network interface I/F unit 701 for connecting to the network 17, a work instruction content storage unit 703 and a storage controller 702 that controls access to the work instruction content storage unit 703.

Figure 19:
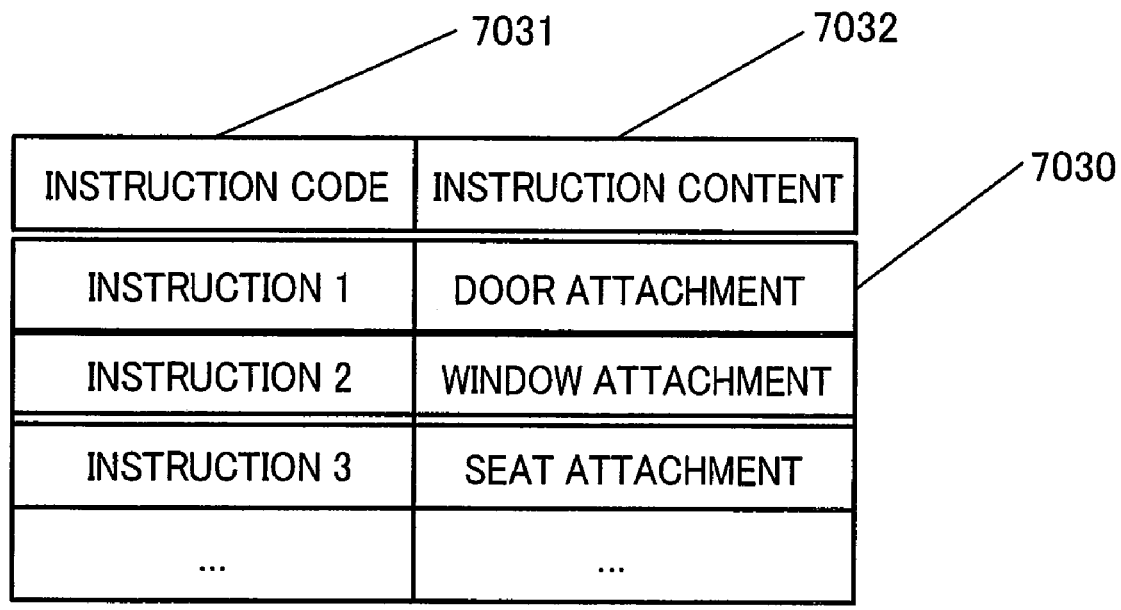
FIG. 19 is a diagram showing an example of registration content of a work instruction content storage unit.

The content of work instruction at the time of manufacturing is registered in the work instruction content storage unit 703. FIG. 19 is a diagram showing an example of registration content of the work instruction content storage unit 703. As shown in FIG. 19, the work instruction content storage unit 703 includes a field 7031 for registering an instruction code, and a field 7032 for registering instruction content corresponding to the instruction code, and thereby, a record 7030 is formed.

Figure 20:
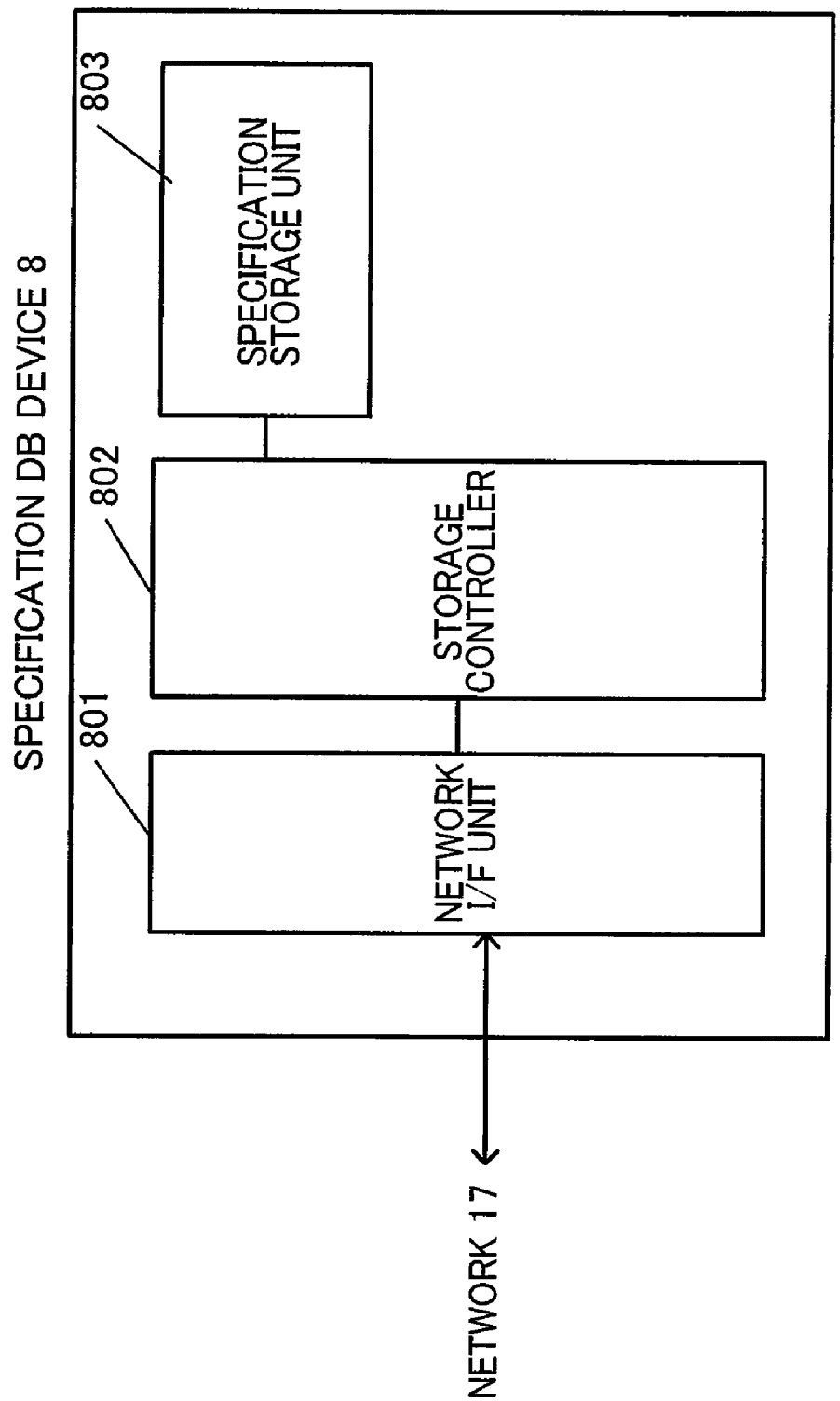
FIG. 20 is a schematic configuration diagram of a specification database.

Furthermore, the specification DB device 8 of the present embodiment is a device that manages a specification of each automobile manufactured through the manufacturing process. FIG. 20 is a schematic configuration diagram of the specification DB device 8. As shown in FIG. 20, the specification DB device 8 includes a network I/F unit 801 for connecting to the network 17, a specification storage unit 803 and a storage controller that controls access to the specification storage unit 803.

The specification of an automobile to be manufactured is registered to the specification storage unit 803. FIG. 21 is a diagram showing an example of registration content of the specification storage unit 803. As shown in FIG. 21, the specification storage unit 803 includes a field 8031 for registering a vehicle body number, a field 8032 for registering a vehicle color, a field 8033 for registering a vehicle type and a field 8034 for registering other kinds of information, and thereby, a record 8030 is formed.

Electronic Paper

Figure 22:
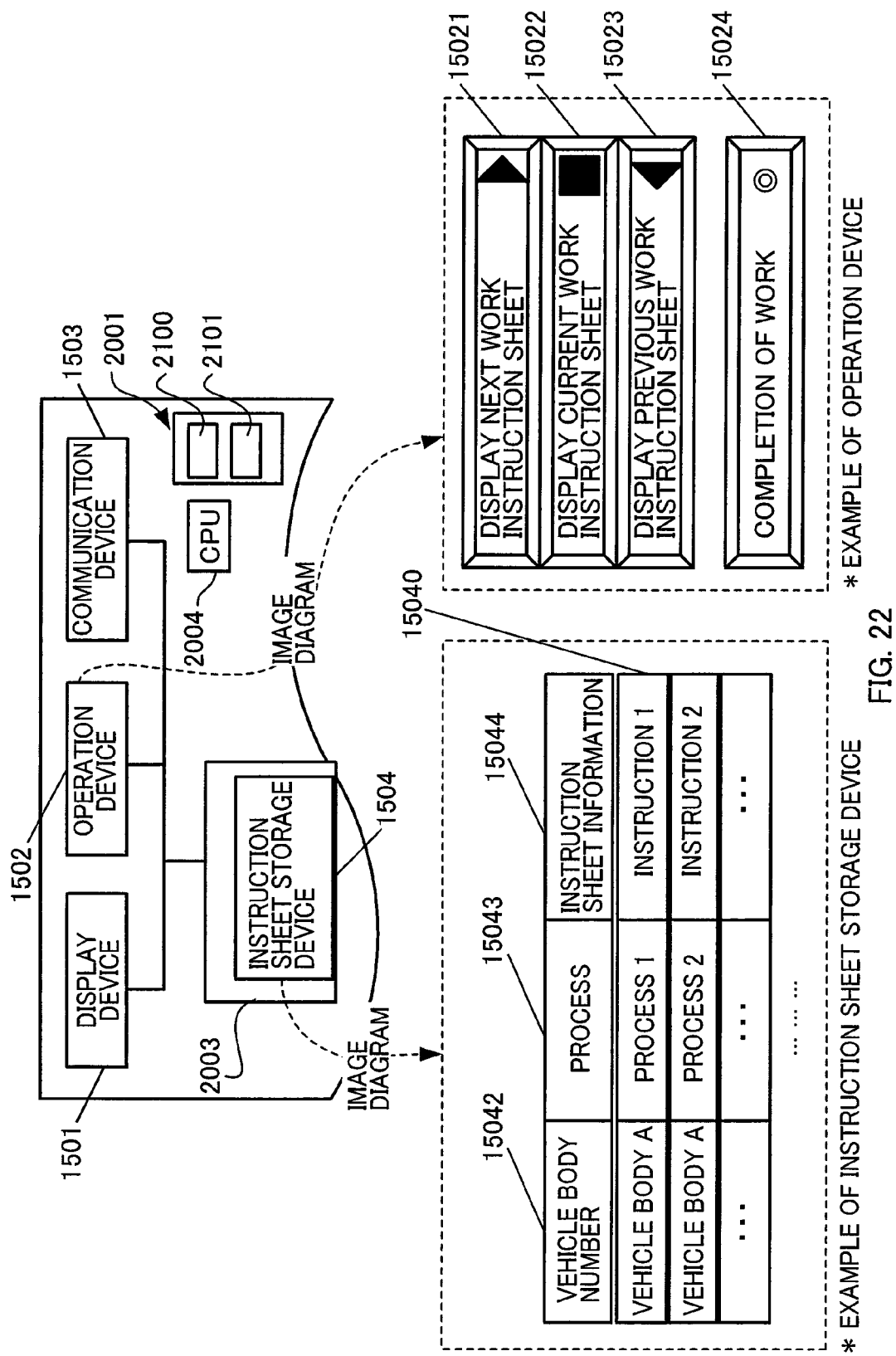
FIG. 22 is a schematic configuration diagram of an electronic paper that is a work instruction sheet.

Next, a description will be given of the electronic paper 15 used as the output destination of work instruction sheet data of the present embodiment. FIG. 22 is a schematic configuration diagram of the electronic paper 15 that is a work instruction sheet. Work instruction sheet data is transmitted to the electronic paper 15 from the work instruction device 1 of the aforementioned configuration via the network 9 and the information distributor 14. As shown in FIG. 22, the electronic paper 15 includes a display device 1501 (display unit), an operation device 1502 (input interface), a communication device 1503, an instruction sheet storage device 1504 (memory) and a processing unit 2004. The electronic paper 15 is a work instruction sheet medium provided to a product or an accompanying object (a product conveyer tray or the like) that moves along with the product.

In addition, the electronic paper 15 receives work instruction sheet data and vehicle information via the information distributor 14 by use of the communication device 1503. Upon receipt of the data and information, the communication device 1503 registers the work instruction sheet data to the instruction sheet storage device 1504. Next, the display device 1501 reads and then displays the work instruction sheet data registered in the instruction sheet storage device 1504. Each piece of the work instruction sheet data in this instruction sheet storage device 1504 is stored as a record 15040 formed of a vehicle body number 15042, a process 15043 and instruction sheet information 15044.

Furthermore, the operation device 1502 of the electronic paper 15 includes, for example, a button 15021 used for displaying a work instruction sheet of the next process, a button 15022 used for displaying a work instruction sheet of the current process, a button 15023 used for displaying a work instruction sheet of the previous process, and a button 15024 used for notification of completion of the work. The work content of the operation device 1502 is transmitted to the work instruction device 1 via the communication device 1503.

Next, a description will be given of function units configured and maintained by the electronic paper 15 on the basis of a program 2002, for example. The electronic paper 15 includes a data obtaining unit 2100 configured to receive the work instruction sheet data by performing data communications with the work instruction support unit 4 and then to store the data in the instruction sheet storage device 1504; and a display processor 2101 configured to display the work instruction sheet data stored in the instruction sheet storage device 1504 on the display device 1501.

The data obtaining unit 2100 is configured to receive work instruction sheet data related to the manufacturing process and any one of the previous and subsequent processes of the manufacturing process, and to store the work instruction sheet data for the plurality of processes in the instruction sheet storage device 1504. In addition, upon receipt of a display-content transition instruction from the operation device 1502 that is the input interface included in the electronic paper 15, the display processor 2101 reads, from the instruction sheet storage device 1504, work instruction sheet data of the process indicated by the transition instruction and then displays the work instruction sheet data on the display device 1501.

Furthermore, in a case where the display processor 2101 searches the instruction sheet storage device 1504 for work instruction sheet data of the process indicated by the transition instruction, and finds that the work instruction sheet data is not stored in the instruction sheet storage device 1504, the display processor 2101 notifies the data obtaining unit 2100 of a request for obtaining work instruction sheet data related to the process. In this case, the data obtaining unit 2100 transmits the data obtaining request to the instruction sheet form generation support unit 6. At this time, the instruction sheet form generation support unit 6 receives the data obtaining request, then matches information on the given manufacturing process of the given product in the data obtaining request with the third table, then, specifies the work instruction sheet information on the given manufacturing process of the given product. The instruction sheet form generation support unit 6 then generates work instruction sheet data by setting color information (originating from the specification DB device 8) of the product included in the information on the product to the background color or font color in the work instruction sheet related to the given manufacturing process specified here. The work instruction sheet data is distributed to the electronic paper 15 via the work instruction support unit 4, the network 9 and the information distributor 14.

It should be noted that each of the function units 2, 4 and 6 of the work instruction management device 1 and also each of the function units 2100 and 2101 of the electronic paper 15, both constituting the system 10 as have been described, may be implemented by hardware or as a program stored in an appropriate storage device such as a memory or hard disk drive (HDD). In this case, the CPU 1004 or 2004 reads the program from the storage device to the memory 1003 or 2003 at the time when the program needs to be executed, and then executes the program. In addition, the program may be downloaded to an external storage device (such as a hard disk drive) from a recording medium (such as a CD-ROM, a portable memory or the like) by use of a reading device included in the work instruction management device 1 or the electronic paper 15. Here, the program may otherwise be downloaded from the network 9 via the communication device 1007 or 1503. Thereafter, the program is loaded to a memory and executed by the CPU. Furthermore, the program may be loaded directly from a recording medium by use of a reading device or from a network by use of a communication device to the memory, and be then executed by the CPU.

Moreover, as to the networks 9 and 17, in addition to the Internet and a LAN, various networks such as an ATM line, a dedicated line, a wide area network (WAN), an electronic lamp line network, a radio network, a public line network, a portable phone line network and a serial interface communication line can be employed. Furthermore, by use of a virtual dedicated network technique such as a virtual private network (VPN), communications having increased security are preferably established in a case where the internet is employed. Incidentally, the serial interface refers to an interface for connecting to an external device by serial data transmission in which bits of data are sequentially transmitted one bit at a time by use of a single signal line. As the communication method, RS-232C, RS-422, IrDA, USB, IEEE1394, fiber channel or the like may be employed.

Databases

Next, descriptions will be given of the first to third tables utilized by the system 10 (the work instruction management device 1 and the electronic paper 15) and of the correspondence between the tables and the databases of the present embodiment. First, the first table is a table defining correspondences between stored information in radio frequency IC tags respectively provided and attached to products or to accompanying objects moving together with the respective products, and information on the products (mainly specification or the like). Since a vehicle body number is cited as the stored information in an RFID 11 in the example of the present embodiment, by considering this vehicle body number as the key, the database storing a special instruction and specification information can be regarded as the first table. Accordingly, when both of the work sequence storage unit 303 and the specification storage unit 803 are used in combination, the two units operate as the first table.

Next, the second table is a table defining correspondences between radio frequency IC tag readers 500 provided to be used in manufacturing processes of the products, and the manufacturing processes in which the radio frequency IC tag readers 500 are provided. Since an ID of each of the radio frequency IC tag reader 500 itself is the name of the manufacturing process in the example of the present embodiment, the correspondence is not particularly shown. In a case where the ID of the radio frequency IC tag reader 500 is a manufacturing number or MAC address, the work instruction device 1 is supposed to include a correspondence table between a manufacturing number or MAC address and the manufacturing process.

Next, the third table is a table defining correspondences between the manufacturing processes for each of the products and work instruction sheets for the respective manufacturing processes. The third table corresponds to the instruction sheet form storage unit 623 stored in the storage unit 620 of the instruction sheet form generation support unit 6 of the present embodiment. In addition, the instruction font header pattern storage unit 621 and the instruction font main content pattern storage unit 622 compliment the instruction sheet form storage unit 623 and define a display form (color, area, content, size or the like) of the header or the main content of the work instruction sheet in accordance with the special instruction, vehicle body color or product color.

In any cases, as long as the data to be stored in the first to the third tables of the present invention are arranged in a manner that the data can be utilized by the work instruction device 1 or the electronic paper 15, there is no problem even in a case where the data to be included in each of the first to the third tables is, for the sake of convenience of the operation, appropriately divided and then arranged in separate databases in a manner that the data are associated with one another by use of the same key (vehicle number or the like).

Example of Overall Flow

Figure 23:
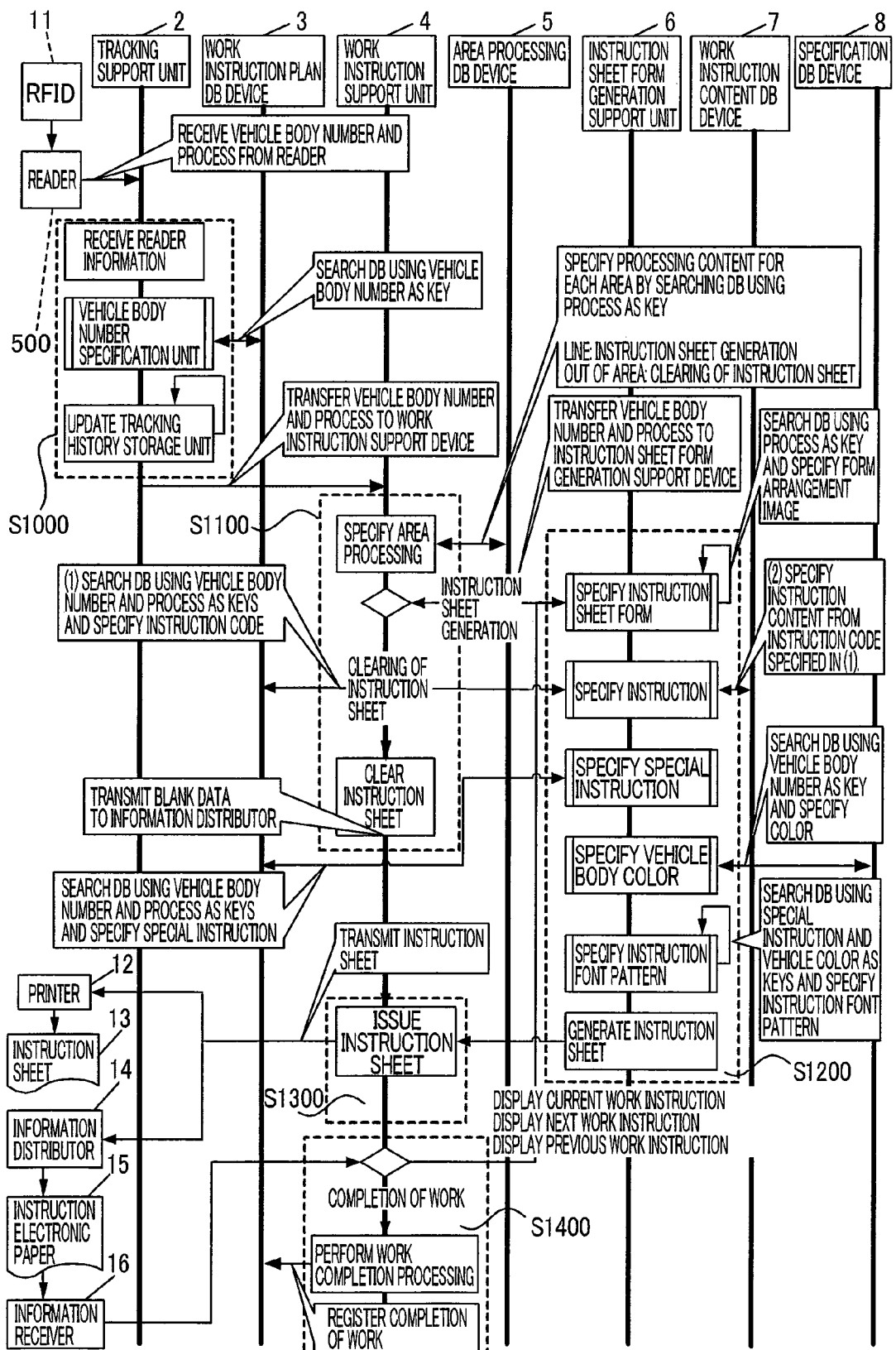
FIG. 23 is a diagram showing a processing procedure example of a work instruction management method of the present embodiment.

Hereinafter, a description will be given of an actual procedure of the work instruction management method of the present embodiment in reference to the drawing. It should be noted that various operations corresponding to the work instruction management method described below are implemented by the respective programs 1002 and 2002 of the work instruction management device 1 and the electronic paper 15 which both constitute the system 10. Specifically, the program 1002 is read to the memory 1003 and then executed by the work instruction management device 1, and the program 2002 is read to the memory 2003 and then executed by the electronic paper 15. The programs 1002 and 2002 are formed of program codes for performing various operations to be described below. FIG. 23 is a diagram showing an example of a processing procedure of the work instruction management method of the present embodiment. Since the processing flow of each of the tracking support unit 2, the work instruction support unit 4 and the instruction sheet form generation support unit 6 is already described above, the details thereof are omitted here in the description of the overall flow, and the entire flow will be broadly described.

Suppose that an RFID 11 is attached to a half completed product of a vehicle moving down a manufacturing line. This RFID 11 is a target for the radio frequency IC tag reader 500 to perform a read out operation. With this respect, the tracking support unit 2 receives readout data from the radio frequency IC tag reader 500 and executes a specification process of the vehicle body and an update process of the tracking history (S1000).

In addition, the information such as the vehicle body number obtained by the tracking support unit 2 is notified to the work instruction support unit 4. In this work instruction support unit 4, at which process (whether or not the vehicle body is at an area outside of the area of the manufacturing process) the vehicle body is currently located is specified, and whether or not work instruction sheet data needs to be generated is determined in accordance with the specified location. In accordance with the determination, the work instruction support unit 4 transmits an instruction to generate work instruction sheet data or an instruction to clear the data, to the instruction sheet form generation support unit 6 (S1100).

Upon receipt of the instruction to generate instruction sheet data or to clear the data, the instruction sheet form generation support unit 6 specifies the instruction sheet form of the given process of the given vehicle body, then generates work instruction sheet data by setting a display color of the background or font in accordance with the special instruction or vehicle body color (S1200). The work instruction sheet data generated here is transmitted to the work instruction support unit 4.

The work instruction support unit 4 receives the work instruction sheet data and then distributes the data to the electronic paper 15 or the printer 12 (the work instruction sheet 13 of a paper medium is printed out) (S1300). In the electronic paper 15, the distributed work instruction sheet data is displayed.

In addition, when completion of the work is reported from the electronic paper 15, the work instruction support unit 4 receiving the report records, in the appropriate database, a record indicating that the manufacturing process related to the given vehicle body is completed and ends the process (S1400).

As described above, according to the present embodiment, a work instruction sheet matching a product color such as a vehicle color of an automobile to be manufactured can be provided which is particularly advantageous in a manufacturing process including a large amount of work such as a production process of an automobile. In addition, it is possible to employ a scheme in which a work instruction sheet is displayed upon request from an operator. Moreover, it is possible to control the system so that content of a work instruction sheet is deleted in a case where a product or the like, namely, a work instruction sheet, goes outside of the area of a manufacturing process. As described above, a work instruction sheet can be displayed upon request from an operator, and furthermore, a work instruction sheet with a color for each of the divided processes can be displayed. Accordingly, an operator can easily recognize necessary information in an efficient and secured manner. For this reason, accidental skipping of a work in a manufacturing process is less likely to occur, and it is possible to fundamentally prevent an error or the like in attaching a work instruction sheet. Moreover, since the system allows an operator to operate at his or her own pace, the accuracy of a work itself improves. In addition, since content of a work instruction sheet is deleted in an area outside of the work area, that is, the area outside of the manufacturing process, various problems caused by loss of a work instruction sheet including confidential information, personal information or the like can be prevented. Specifically, the system can accomplish a sufficient effect as a prevention measure for information leakage.

Accordingly, a technique for generating/managing work instruction sheets that can be easily used and recognized by operators, and a security management technique for work instruction sheets can be provided.

As described above, the descriptions of an embodiment of the present invention have been provided on the basis of the embodiment. The present invention is, however, not limited to this. Various modifications can be applied to the embodiment without departing from the spirit and scope of the invention.

What is claimed is:

1. A work instruction management system, managing work instruction sheets at the time of manufacturing products, comprising:
   a first table defining correspondences between stored information in radio frequency IC tags provided to products or accompanying objects moving along with the products and product information including color information indicating a color of the products;
   a second table defining correspondences between radio frequency IC tag readers provided to manufacturing processes of the products and the manufacturing processes to which the respective radio frequency IC tag readers are provided;
   a third table defining correspondences between the manufacturing processes for each of the products and work instruction sheets for the respective manufacturing processes;
   a tag information obtaining unit configured to obtain the stored information in each of the radio frequency IC tags read by each of the radio frequency IC tag readers and information on the radio frequency IC tag reader itself by performing data communications with the radio frequency IC tag reader and to store the information in a memory;
   a tracking support unit configured to read the stored information and the information on the radio frequency IC tag reader from the memory, then to obtain product information of the given product by matching the stored information with the first table, then to specify a manufacturing process by matching the information on the radio frequency IC tag reader with the second table and to store the obtained product information on the product and the information on the specified manufacturing process in the memory;
   an instruction sheet form generation support unit configured to read the product information on the product and the information on the manufacturing process from the memory, then to specify a work instruction sheet for the given manufacturing process of the given product by matching the information with the third table, as well as to create work instruction sheet data by setting either a background color or font color of the specified work instruction sheet to the color of the product as indicated by the color information included in the product information, and then to store the work instruction sheet data in the memory;
   a work instruction support unit configured to read the work instruction sheet data from the memory and then to perform output processing for outputting the work instruction sheet data to an output interface;
   an electronic paper:
   the electronic paper including:
      a memory;
      an arithmetic unit;
      a communication device configured to perform data communications with the work instruction support unit;
      a display device; and
         the electronic paper being a work instruction sheet medium provided to corresponding one of the products or of the accompanying articles moving along with the products, wherein the work instruction support unit outputs the work instruction sheet data to the electronic paper; and
   the electronic paper further includes:
      a data obtaining unit configured to receive the work instruction sheet data by performing data communications with the work instruction sheet support unit and then to store the work instruction sheet data in a memory; and
      a display processor configured to display the work instruction sheet data stored in the memory on a display device.

2. The work instruction management system according to claim 1, wherein:
   the second table defines correspondences between radio frequency IC tag readers arranged in manufacturing processes of the products and at the end boundaries of the manufacturing processes and the manufacturing processes and an area outside of the manufacturing processes, in which the radio frequency IC tag readers are arranged;
   the third table defines a work instruction sheet in an area outside of the manufacturing processes in addition to the correspondences between the manufacturing processes for each of the products and work instruction sheets for the respective manufacturing processes;
   the tracking support unit determines, by matching information on the radio frequency IC tag reader with the second table, whether or not the given IC tag is located at the area outside of the manufacturing processes, and then stores, in the memory, the product information on the product and determination event data regarding the area outside of the manufacturing processes;

the instruction sheet form generation support unit specifies a work instruction sheet in the area outside of the manufacturing processes of the given product by reading the product information on the product and the determination event data regarding the area outside of the manufacturing processes from the memory and matching the information and data with the third table, and then stores the specified work instruction sheet data of the area outside of the manufacturing processes in the memory; and the work instruction support unit reads the work instruction sheet data of the area outside of the manufacturing processes from the memory and then performs processing for outputting the work instruction sheet data to the electronic paper.

3. The work instruction management system according to claim 2, wherein the work instruction sheet of the area outside of the manufacturing processes includes data in which description content as to all of or a specific part of display content of the work instruction sheet is cleared.

4. The work instruction management system according to claim 1, wherein:

the instruction sheet form generation support unit reads the product information on a product and information on a manufacturing process from the memory, then specifies work instruction sheets for the given manufacturing process of the given product and for any one of the previous and subsequent manufacturing processes of the given manufacturing process by matching the information with the third table, then generates work instruction sheet data by setting color information of a product included in the product information on the product to either a background color or font color in the work instruction sheets related to the specified manufacturing process and any one of the previous and subsequent manufacturing processes, and stores the generated work instruction sheet data in the memory;

the work instruction support unit reads the work instruction sheet data related to the given manufacturing process and the previous or subsequent manufacturing process of the given manufacturing process and then performs processing for outputting the data to the electronic paper; and in the electronic paper, the data obtaining unit receives, from the work instruction support unit, the work instruction sheet data related to the manufacturing process and the previous or subsequent manufacturing processes of the manufacturing process and stores the work instruction data for the plurality of processes in the memory; and the display processor reads work instruction sheet data of a process indicated by a transmission instruction from the memory upon receipt of the transition instruction of display content from an input interface included in the electronic paper and then displays the work instruction sheet data on a display device.

5. The work instruction management system according to claim 4, wherein:

in the electronic paper, in a case where the display processor searches the memory for the work instruction sheet data of a process indicated by the transition instruction and finds that the work instruction sheet data of the given process is not stored in the memory, the display processor notifies the data obtaining unit of a request for obtaining the work instruction sheet data related to the given process;

the data obtaining unit transmits the request for obtaining the data to the instruction sheet form generation support unit; and the instruction sheet form generation support unit receives the request for obtaining the data, then specifies a work instruction sheet of the given manufacturing process of the given product by matching information on the given manufacturing process of the given product included in the request for obtaining the data with the third table, then generates work instruction sheet data by setting color information of the product included in the product information on the product to either a background color or font color of the specified work instruction sheet related to the given manufacturing process, and then stores the generated work instruction sheet data in a memory.

* * * * *